(12) United States Patent
Cohen

(10) Patent No.: US 6,886,761 B2
(45) Date of Patent: *May 3, 2005

(54) DRIP IRRIGATION HOSE AND METHOD AND APPARATUS FOR MAKING SAME

(76) Inventor: Amir Cohen, Yuvalim, 20142 Doar Na Misgav (IL)

( * ) Notice: Subject to any disclaimer, the term of this patent is extended or adjusted under 35 U.S.C. 154(b) by 171 days.

This patent is subject to a terminal disclaimer.

(21) Appl. No.: 10/197,433

(22) Filed: Jul. 18, 2002

(65) Prior Publication Data

US 2003/0057301 A1 Mar. 27, 2003

Related U.S. Application Data

(63) Continuation-in-part of application No. 09/639,768, filed on Aug. 21, 2000, now Pat. No. 6,371,390, which is a continuation-in-part of application No. 09/639,768, filed on Aug. 21, 2000, now Pat. No. 6,371,390.

(60) Provisional application No. 60/332,568, filed on Nov. 26, 2001.

(51) Int. Cl.[7] .............................................. B05B 15/00
(52) U.S. Cl. ..................... 239/542; 239/547; 156/203
(58) Field of Search ................ 138/42–46, 28, 138/26; 239/450, 542, 547, 533.13, 533.1, 568; 156/203, 218, 244.11, 242, 210.1

(56) References Cited

U.S. PATENT DOCUMENTS

| | | |
|---|---|---|
| 4,196,853 A | 4/1980 | Delmer .................... 239/116 |
| 4,642,152 A | 2/1987 | Chapin ...................... 156/203 |
| 4,880,167 A | 11/1989 | Langa et al. ............... 239/542 |
| 5,163,622 A | 11/1992 | Cohen ........................ 239/542 |
| 5,183,208 A | 2/1993 | Cohen ........................ 239/542 |
| 5,203,503 A | 4/1993 | Cohen ........................... 239/1 |
| 5,246,171 A | 9/1993 | Roberts ...................... 239/542 |
| 5,333,793 A | 8/1994 | DeFrank .................. 239/533.1 |
| 5,375,770 A | 12/1994 | Roberts ................. 239/533.13 |
| 5,400,973 A | 3/1995 | Cohen ..................... 239/533.1 |
| 5,458,712 A | 10/1995 | DeFrank .................... 156/203 |
| 5,522,551 A | 6/1996 | DeFrank et al. ............ 239/542 |
| 5,620,143 A | 4/1997 | Delmer et al. .............. 239/542 |
| 5,695,127 A | 12/1997 | Delmer et al. .............. 239/542 |
| 5,732,887 A | 3/1998 | Roberts ...................... 239/542 |
| 5,785,785 A | 7/1998 | Delmer et al. .............. 156/203 |
| 6,027,048 A | 2/2000 | Mehoudar ................... 239/542 |
| 6,371,390 B1 | 4/2002 | Cohen ........................ 239/542 |

Primary Examiner—Michael Mar
Assistant Examiner—Thach H Bui
(74) Attorney, Agent, or Firm—G. E. Ehrlich Ltd.

(57) ABSTRACT

A drip irrigation hose formed with a plurality of outlets for discharging the water at longitudinally-spaced locations along the length of the hose includes a plurality of emitter elements secured to the hose at longitudinally-spaced locations along its length to define a plurality of turbulent flow passageways each in communication with the interior of the hose for discharging water from a hose outlet at a slow rate. Each of the turbulent flow passageways is defined by a relatively elastic first material co-extruded with a relatively inelastic second material both bonded to the hose with the relatively elastic material being pressure-deformable, as compared to the relatively inelastic material, to change the turbulent flow passageway of each emitter element in response to the pressure of the water in the hose at the respective emitter element.

50 Claims, 31 Drawing Sheets

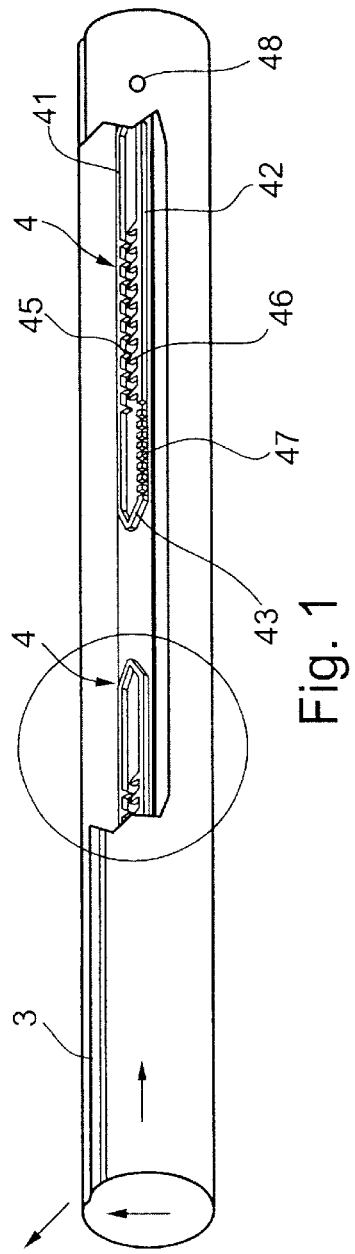
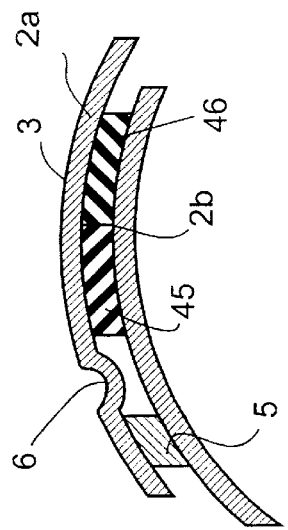
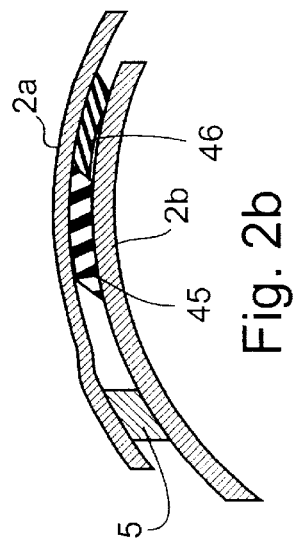
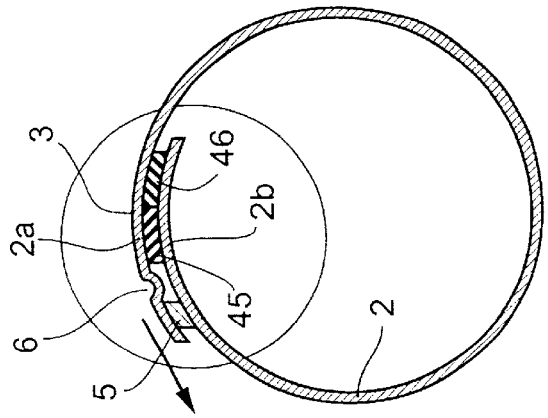
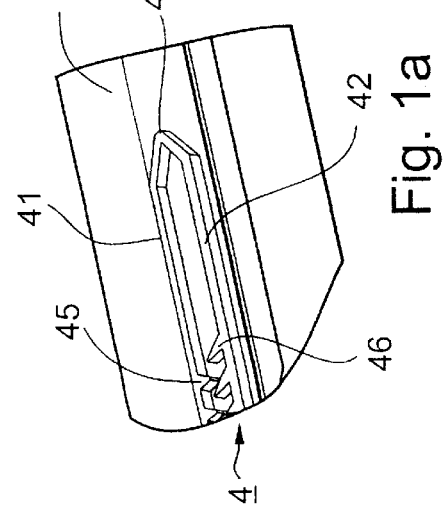

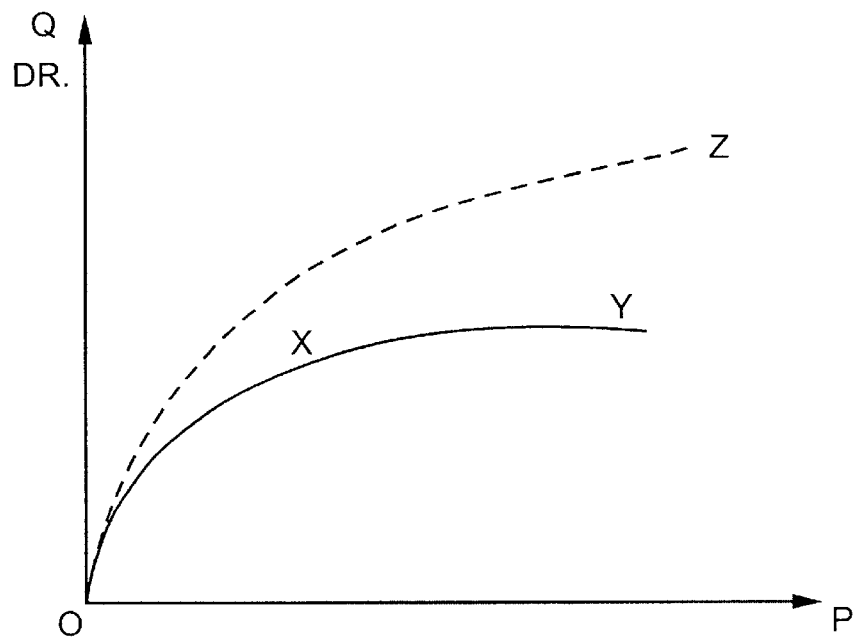
Fig. 3
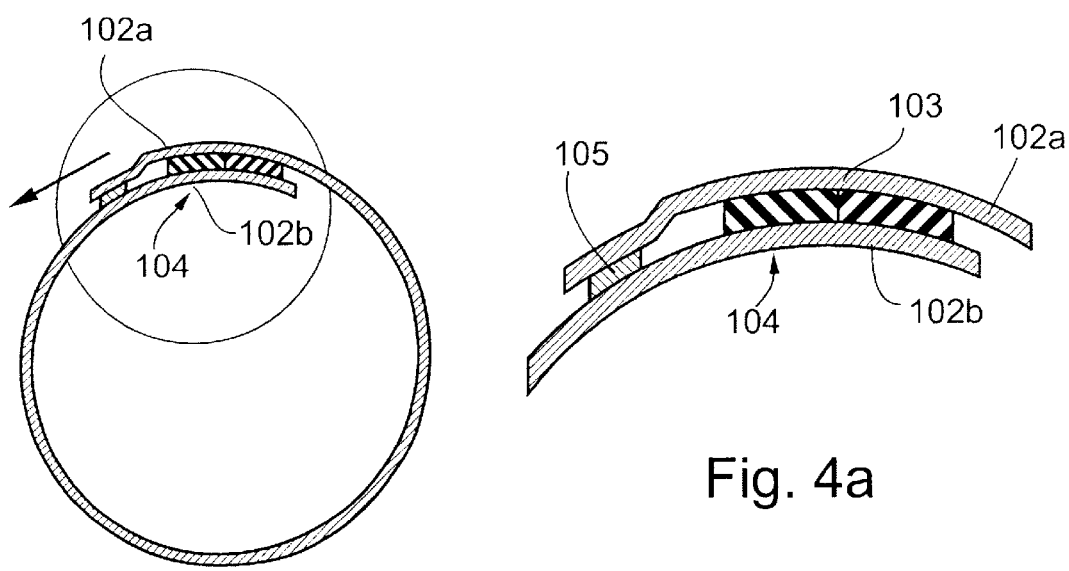
Fig. 4a
Fig. 4

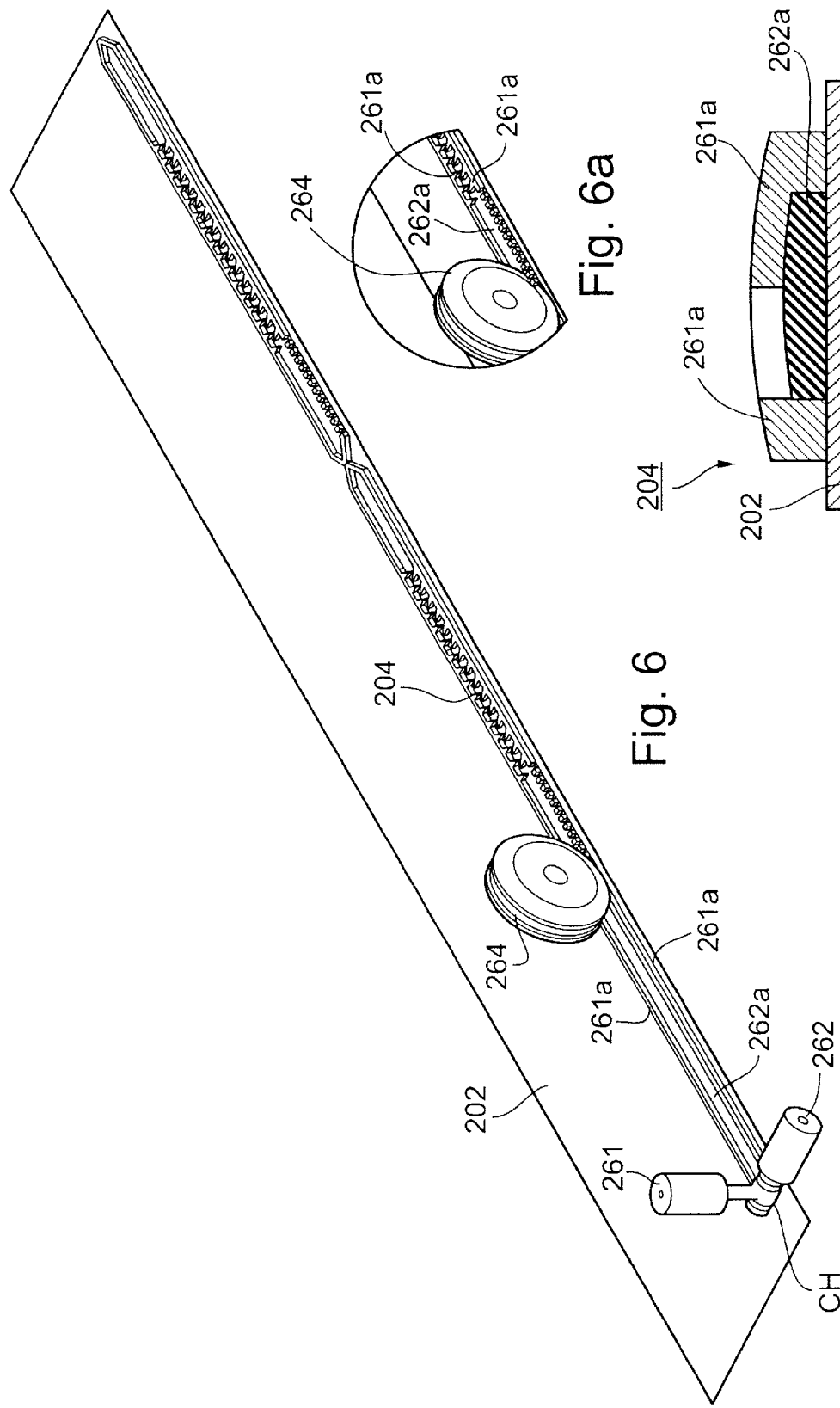

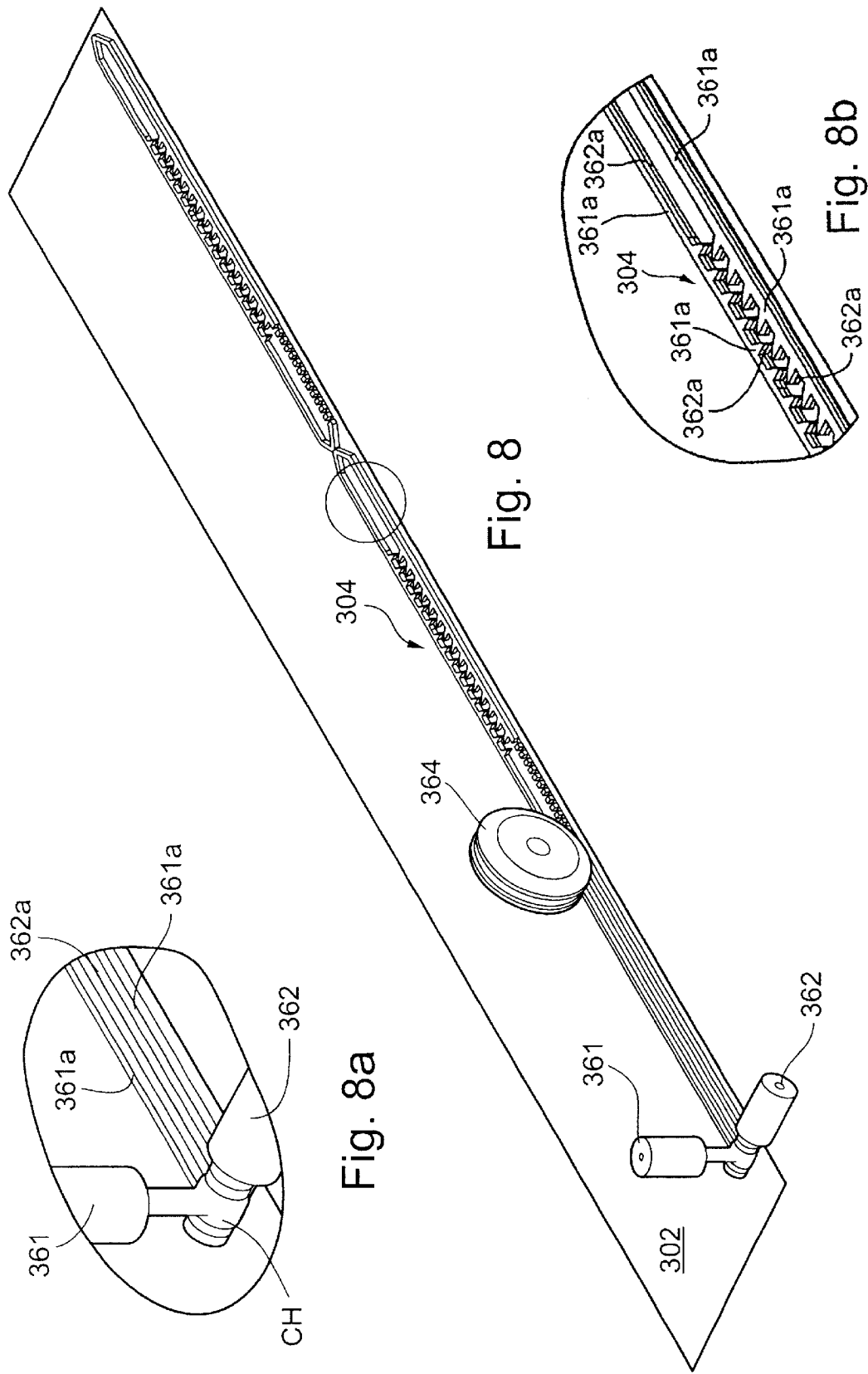

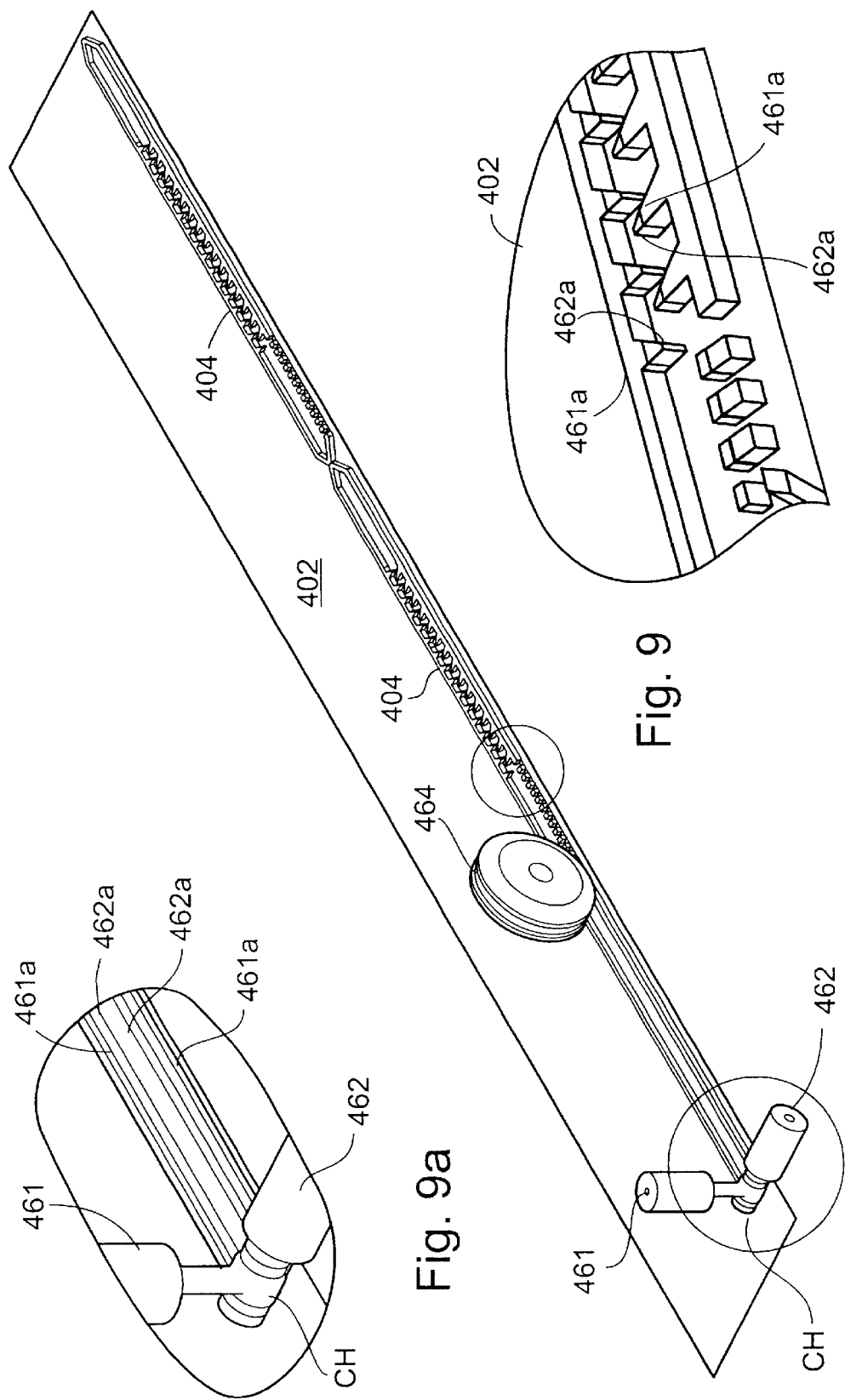

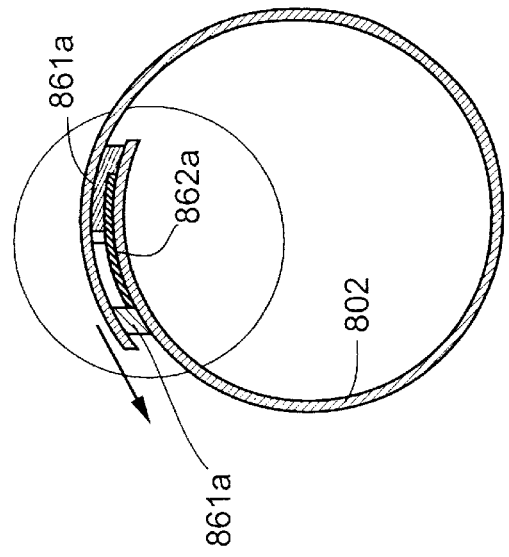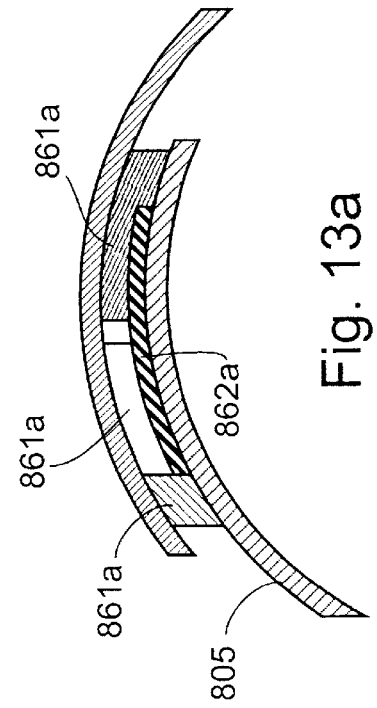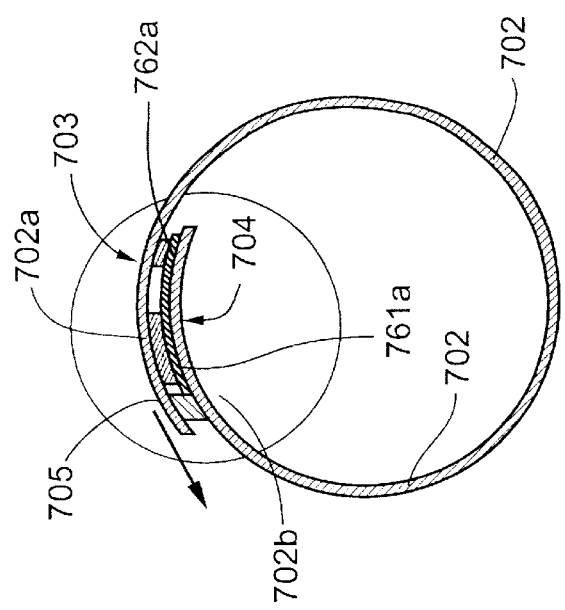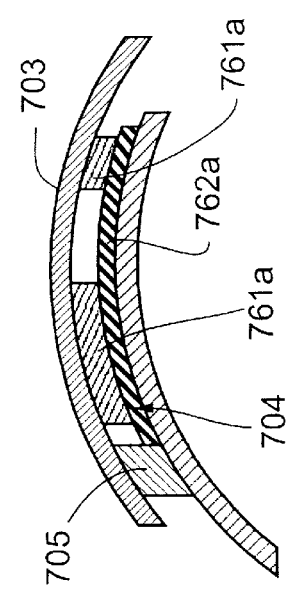

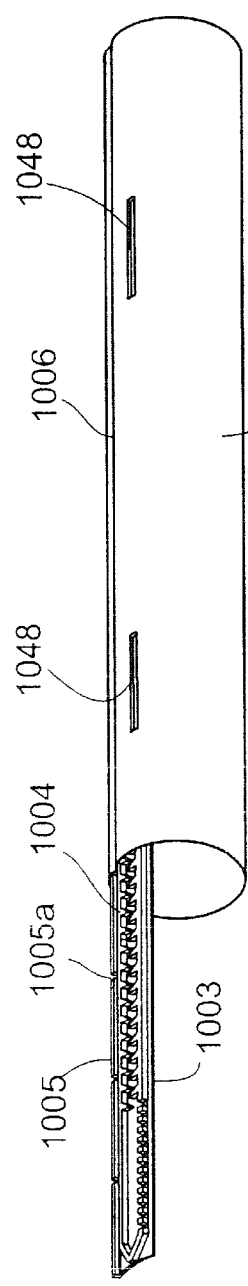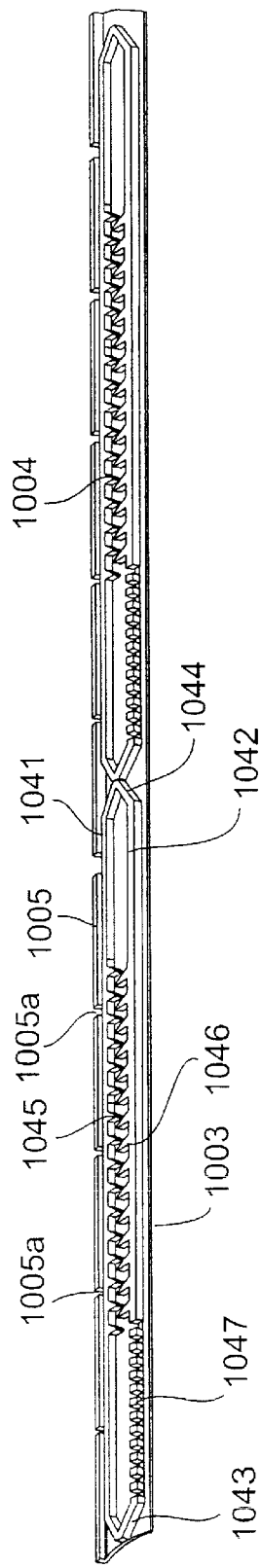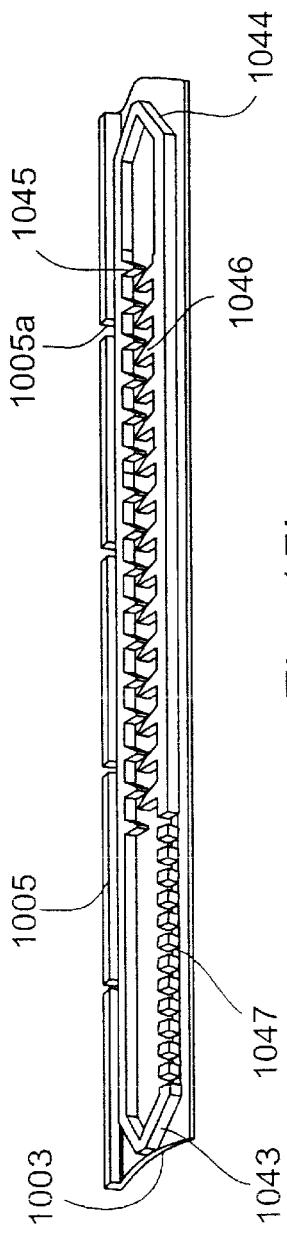

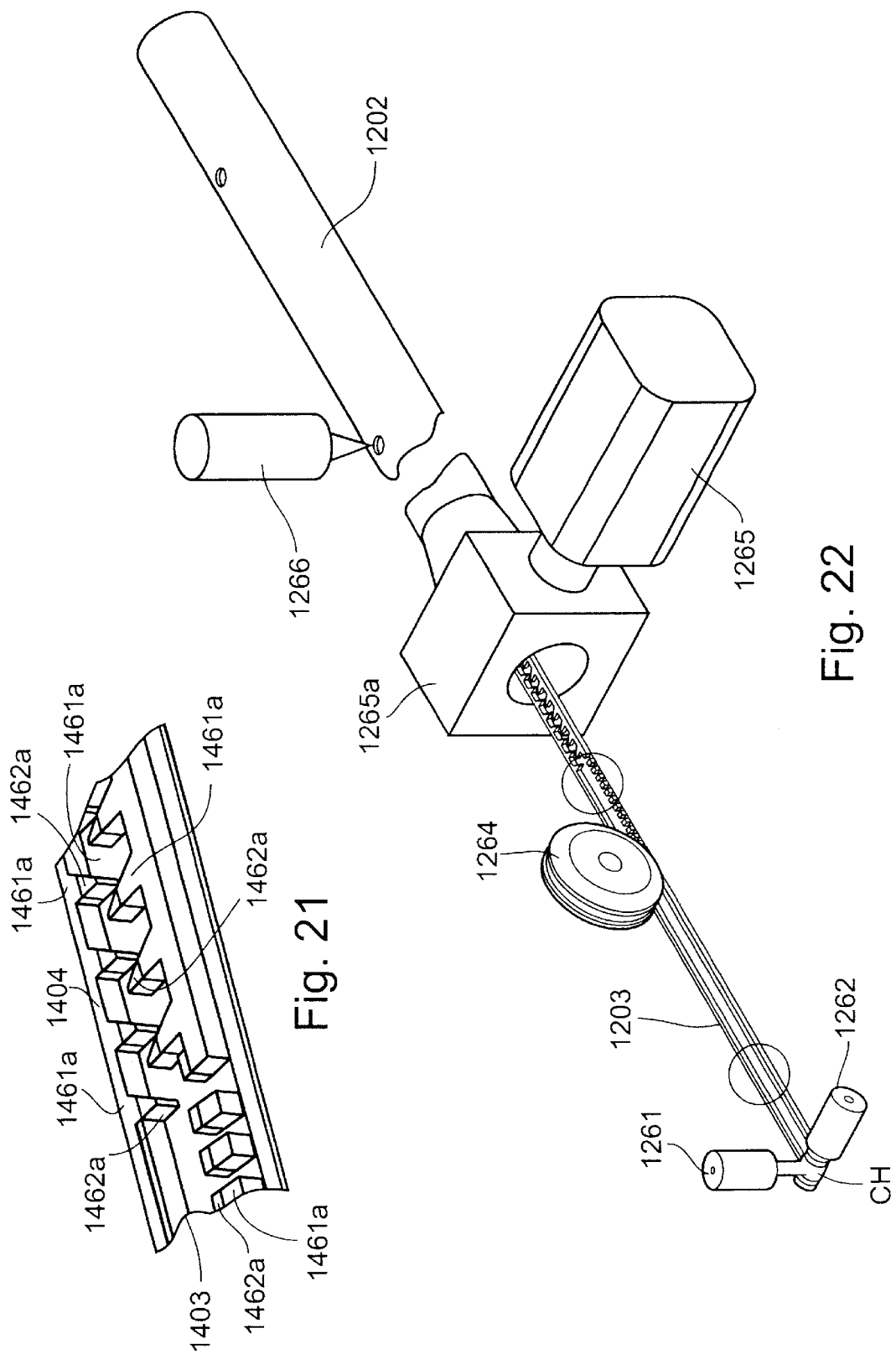

DRIP IRRIGATION HOSE AND METHOD AND APPARATUS FOR MAKING SAME

RELATED APPLICATIONS

The present application is a continuation-in-part of International Patent Application PCT/IL01/00751, filed Aug. 13, 2001, published Feb. 28, 2002 as International Publication No. WO 02/15670 A2, which is a continuation-in-part, and claiming the priority date of, U.S. application Ser. No. 09/639,768 filed Aug. 21, 2000 and issued as U.S. Pat. No. 6,371,390 on Apr. 16, 2002. The present application also includes subject matter of U.S. Provisional Application 60/332,568, filed Nov. 26, 2001, the priority of date which is also herein claimed, and the contents of which are incorporated herein by reference.

FIELD AND BACKGROUND OF THE INVENTION

The present invention relates to drip irrigation hoses, and to methods and apparatus for making such hoses.

Drip irrigation hoses are increasingly being used for irrigating various types of plants since they supply the water directly to the root regions of the plants, and therefore are highly conservative of water resources. One type of irrigation hose is constructed by simultaneously extruding a plastic hose and bonding to its inner surface a plurality of emitter elements, or a strip of emitters, spaced longitudinally of the hose for discharging the water at a slow rate via discharge openings formed in the hose. Another type includes a sheet of flexible plastic material formed into a seamed hose, with the emitter elements bonded within the seam or to another part of the hose for discharging the water at a slow rate through discharge openings in the hose. The present invention is applicable to both types of drip irrigation hoses.

Examples of drip irrigation hoses of these types are described in U.S. Pat. Nos. 4,196,853; 5,163,622; 5,183,208; 5,203,503; 5,246,171; 5,333,793; 5,522,551; 5,620,143; 5,695,127; 5,785,785 and 6,027,048.

One problem in using drip irrigation hoses is the difficulty in ensuring relatively uniform discharge rates along the length of the hose. This problem is particularly acute where extremely long lengths of the hose are used since the hose itself produces a pressure drop along its length tending to decrease the discharge rate of the emitters at the end of the hose. This sensitivity of the discharge rate to the water pressure is also a problem where the land being irrigated is not flat and even.

Another problem with such drip irrigation hoses is sensitivity to clogging, and the difficulty in dislodging clogging particles.

In addition, such drip irrigation hoses are frequently used for only a single season, or for relatively few seasons. Accordingly, the cost involved in producing such drip irrigation hoses is a significant factor in their use.

OBJECTS AND BRIEF SUMMARY OF THE INVENTION

An object of the present invention is to provide a drip irrigation hose in which the discharge rate from each emitter element is less sensitive to changes in the pressure of the water within the hose at the respective emitter element. Another object of the invention is provide a drip irrigation hose which has less sensitivity to clogging, and which more conveniently permits clogging particles to be dislodged. A further object of the invention is to provide a drip irrigation hose of a construction which can be produced in volume and at relatively low cost. Still further objects of the invention are to provide a method and apparatus of making such drip irrigation hoses.

According to one aspect of the invention in the present application, there is provided a drip irrigation hose, comprising: a tube for conducting pressurized water through its interior and formed with a plurality of outlets for discharging the water at longitudinally-spaced locations along the length of the tube; and a plurality of emitter elements secured within the tube at longitudinally-spaced locations along its length to define a plurality of labyrinths each in communication with the interior of the tube for discharging water from a tube outlet at a slow rate; the labyrinths being defined by a continuous strip of a relatively elastic first material bonded to a continuous strip of a relatively inelastic second material such that the relatively elastic first material is pressure-deformable as compared to the relatively inelastic second material to change the labyrinth of each emitter element in response to the pressure of the water in the tube at the respective emitter element.

According to further features in the described preferred embodiments, the continuous strip is shaped to define a of group of teeth for each of the emitter elements producing turbulent flow passageways between them at each of the longitudinally spaced locations along the length of said continuous strip.

According to another aspect of the present inention, there is provided a drip irrigation hose comprising: a tube for conducting pressurized water through its interior and formed with a plurality of outlets for discharging the water at longitudinally-spaced locations along the length of the tube; and a plurality of emitter elements secured to the tube at longitudinally-spaced locations along its length to define a plurality of labyrinths each in communication with the interior of the tube for discharging water from a tube outlet at a slow rate; each of the emitter elements including a relatively elastic material shaped to define at least a part of a labyrinth and a relatively inelastic material underlying the relatively elastic material and bonding same to the inner face of the tube; the relatively inelastic material being in the form of a continuous strip exteinding the length of the tube.

According to a still further aspect of the present invention, there is provided a drip irrigation hose, comprising: a tube for conducting pressurized water through its interior and formed with a plurality of outlets for discharging the water at longitudinally-spaced locations along the length of the tube; and a plurality of emitter elements secured to the tube at longitudinally-spaced locations along its length to define a plurality of labyrinths each in communication with the interior of the tube for discharging water from a tube outlet at a slow rate; the labyrinths being defined by a continuous strip of a relatively inelastic material having a relatively elastic material applied thereto and shaped to define a group of teeth for each of the emitter elements producing turbulent flow passageways with respect to the tube at each of the longitudinally spaced locations along the length of the continuous strip; the drip irrigation hose being formed with a clearance between the tube and the teeth normally bypassing at least a part of each labyrinth in the non-pressurized condition of the hose and being closed in the pressurized condition of the hose to render the labyrinths effective to regulate the flow therethrough in response to pressure.

In one described preferred embodiment, the tips of the teeth are reduced in height to define the clearance. In another described embodiment, the clearance is defined by a longitudinally-extending slack in the tube.

According to a still further aspect of the present invention, there is provided a drip irrigation hose comprising: a tube for conducting pressurized water through its interior and formed with a plurality of outlets for discharging the water at longitudinally-spaced locations along the length of the tube; and a plurality of emitter elements secured within the tube at longitudinally-spaced locations along its length to define a plurality of labyrinths each in communication with the interior of the tube for discharging water from a tube outlet at a slow rate; the plurality of emitter elements including a continuous strip of a relatively elastic material shaped to form a plurality of groups of teeth defining turbulent flow passageways between them at each of the longitudinally spaced locations along the length of the continuous strip, the relatively elastic material defining at least the tips of the teeth integral with an underlayer underlying the teeth.

A number of embodiments are described below wherein the tube is a seamed tube, and the relatively elastic and inelastic materials are bonded within the seam. Other embodiments are described wherein the tube is an extruded tube, and the relatively elastic and inealstic materials are bonded to the inner surface of the extruded tube.

In some embodiments described below, the relatively elastic material is a thermoplastic elastomer. Other embodiments are described wherein the relatively elastic material is made of two liquid materials which, when mixed together and heated, cross-link to produce a relatively elastic solid material. A further embodiment is described wherein the tube includes an adhesive coating on its inner surface to promote the adhesion of the emitter elements thereto and also to strengthen the tube particularly at the outlet openings.

According to further aspects, the invention also provides a new method and a new apparatus for making such drip irrigation hoses.

As will be described more particularly below, a drip irrigation hose constructed in accordance with the foregoing features provides pressure compensation in the water discharge rate from each emitter element, thereby making the discharge from each emitter element less sensitive to changes in the pressure of the water within the hose at the respective emitter element. Certain embodiments of the invention produce not only compressional forces in the emitter elements, but also tangential forces which tend to dislodge clogging particles, thereby lowering the sensitivity to clogging. Many of the foregoing features also enable such drip irrigation hoses to be made in volume and at relatively low cost.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a perspective view, partly broken away, illustrating one form of drip irrigation hose constructed in accordance with the present invention, FIG. 1a being an enlarged fragmentary view of a part of FIG. 1;

FIG. 2 is a transverse sectional view of the drip irrigation hose of FIG. 1, FIG. 2a being an enlarged fragmentary view of FIG. 2 illustrating the initial condition of the hose, and FIG. 2b corresponding to that of FIG. 2a but illustrating the condition of the hose after it is pressurized with irrigation water;

FIG. 3 is a curve illustrating how the water discharge rate from an outlet opening varies with the water pressure in the drip irrigation hose of FIGS. 1 and 2;

FIG. 4 is a transverse sectional view, corresponding to that of FIG. 2 but illustrating a modification in the construction of the drip irrigation hose, FIG. 4a being an enlarged fragmentary view of a part of FIG. 4 in the initial condition of the hose;

FIG. 6 illustrates another method of making the drip irrigation hose, FIG. 6a being enlarged fragmentary view of a part of FIG. 6 after embossment;

FIG. 7 illustrates a section of the drip irrigation hose made according to the method of FIGS. 6 and 6a;

FIG. 8 illustrates another method of making the drip irrigation hose, FIG. 8a illustrating the co-extruders, and FIG. 8b illustrating a part of the hose so made;

FIG. 9 illustrates a further method of making the drip irrigation hose, FIG. 9a illustrating the co-extruders, and FIG. 9b illustrating a part of the hose so made;

FIG. 12 is a transverse sectional view illustrating a further construction of the drip irrigation hose, FIG. 12a being an enlarged fragmentary view of FIG. 12;

FIG. 13 is a transverse sectional view illustrating a still further construction, FIG. 13a being enlarged fragmentary view of a part of FIG. 13;

FIG. 15 is a perspective view illustrating a seamless drip irrigation hose constructed in accordance with the present invention, FIG. 15a illustrating the strip of emitter elements in the hose of FIG. 15, and FIG. 15b being an enlarged illustration of one of the emitter elements in the strip of FIG. 15a;

FIG. 16 is a transverse sectional view of the hose of FIG. 15, FIG. 16a being an enlarged view of a part of FIG. 16 and FIG. 16b being a fragmentary view of a part of the emitter element of FIG. 16a;

FIG. 21 is a fragmentary view illustrating a still further construction;

FIG. 26a is an enlarged fragmentary view of FIG. 26 showing the bypass clearance in the non-pressurized condition of the hose, whereas

FIGS. 29a and 29b are enlarged fragmentary views illustrating parts of the apparatus of FIG. 29;

FIG. 30a is an enlarged fragmentary view illustrating a part of the apparatus of FIG. 30;

Figure 5:
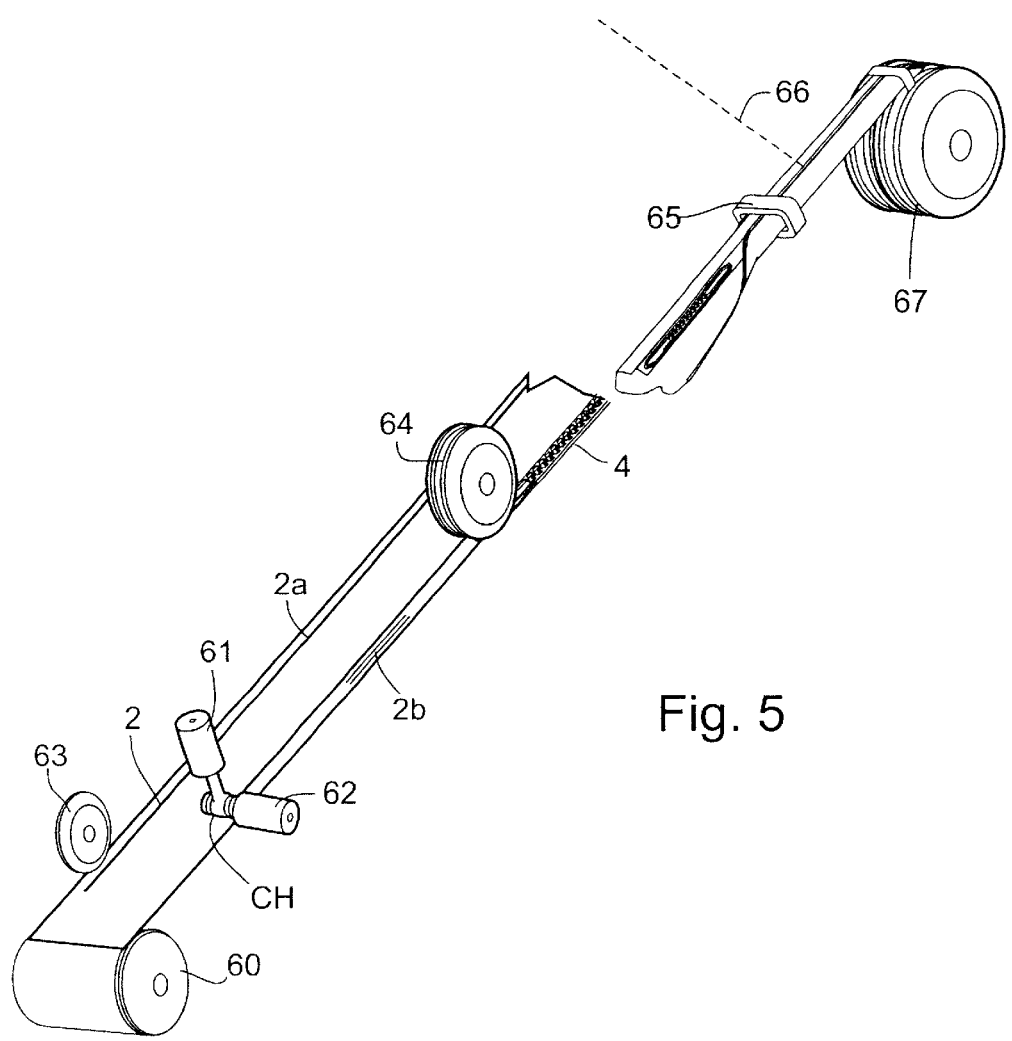
FIG. 5 illustrates one method of making the drip irrigation hose of FIG. 1, FIG. 5a being an enlarged fragmentary view of a part of FIG. 5 before embossment, FIG. 5b being a corresponding view after embossment, and FIG. 5c illustrating a modification in the method of FIG. 5.

It is to be understood that the foregoing drawings, and the description below, are provided primarily for purposes of facilitating understanding the conceptual aspects of the invention and various possible embodiments thereof, including what is presently considered to be preferred embodiments. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

With reference to FIGS. 1 and 2, there is illustrated a drip irrigation hose comprising a sheet 2 of thin, flexible plastic material having opposed outer edge portions 2a, 2b which are overlapped and bonded together to form a seam 3 extending longitudinally of the so-produced tube for conducting pressurized water therethrough. A plurality of emitter elements, each generally designated 4, are bonded to and between the overlapping portions 2a, 2b of the sheet 2 at longitudinally-spaced locations along the seam 3, and define a plurality of restricted flow passageways for discharging water from outlets in the seamed hose at a slow rate.

The overlapping portions 2a, 2b of the flexible sheet are bonded together both by the emitter elements 4, and by a continuous, longitudinally-extending rib 5 extending along the outer edge of the outer overlapping portion 2a. As shown particularly in FIGS. 2 and 2a, the outer overlapping portion 2a is formed with an inwardly-extending slack 6 between the rib 5 and the emitter elements 4. The purpose of slack 6, as will be described more particularly below, is to cause the seamed hose, when pressurized by the water flowing through it, to tauten the hose wall, and thereby to apply a tangential force to the emitter elements 4 within the seam 3, such that thereafter the emitter elements will control the discharge rate through the hose outlets according to the pressure of the water within the hose. Such an arrangement, as described below, decreases the sensitivity of the water discharge rates to changes in pressure of the water within the hose. The tangential force produces relative movement between the overlapping ends of the hose, thereby also tending to dislodge clogging particles within the emitter elements.

The structure of each of the emitter elements 4 is best seen in FIGS. 1 and 1a. Each emitter element includes a pair of spaced longitudinally-extending plastic strips 41, 42 closed at its opposite ends by converging transversely-extending strips 43, 44. Each emitter element further includes a plurality of teeth 45, 46 alternatingly projecting from one longitudinal strip towards the other longitudinal strip to define a labyrinth producing a turbulent flow passageway for the water through the emitter element. The water is inletted into the emitter element via inlet openings 47 (FIG. 1) in longitudinal strip 42 at the inlet end of the labyrinth defined by the teeth 45, 46, and is outletted from the emitter element via an outlet opening 48 in the plastic hose 2 at the outlet end of the labyrinth.

The continuous rib 5 at the outer edge of the seam 3 is made of a relatively inelastic material. Elements 41–46 of the emitter elements 4, however, are made of a relatively elastic material which is softer, more pressure-deformable than the rib 5, and tends to return to its original shape when the pressure is removed. Initially the emitter elements 4 in the embodiment of FIGS. 1 and 2, are of substantially the same height as the rib 5. A preferred relatively inelastic material for the continuous rib 5 is polyethylene, and a preferred relatively elastic material for elements 41–47 of the emitter elements 4 is a thermoplastic elastomer, preferably one selected from the group consisting of EPDM (ethylene propylene rubber), NBR (nitrite rubber), silicone rubber, or other thermosetting elastomer prepared by cross-linking two liquids. A preferred material for making the plastic tube is polyethylene.

In the drip irrigation hose illustrated in FIGS. 1 and 2, it will thus be seen that the plurality of emitter elements incorporated in the seam of the plastic tube 2 include a relatively elastic formation in the form of teeth 45, 46 of relatively elastic plastic material, and a relatively stiff formation in the form of rib 5 of relatively inelastic material, both formations being in direct contact with, and directly bonded to, the inner surface of the plastic material defining the tube 2. It will also be seen that the relatively elastic formation, namely the teeth 45, 46, is pressure-deformable and is located with respect to the relatively stiff formation, namely rib 5, such as to change the labyrinth of the respective emitter element in response to the pressure of the water in the tube at the location of the respective emitter element, and thereby to regulate the water discharge rate at the respective outlet.

FIG. 3 illustrates how the discharge rate from the discharge openings 48 varies with the water supply pressure in the drip irrigation hose of FIG. 1;

Thus, when the hose is first filled with water, the water causes the hose to assume the circular shape illustrated in FIG. 2. In this initial, unpressurized condition of the hose, there is a slack 6 between the outer rib 5 and the emitter elements 4, as shown particularly in FIG. 2a; in this initial condition, there is no significant tangential or shear force applied to the emitter elements 4, and the height of the emitter elements 4 remains substantially the same as the height of the rib 5.

As the hose 2 is filled with pressurized water, the pressure tends to increase the diameter of the hose 2. Since the rib 5 is firmly bonded between the overlapping sheet portions 2a, 2b of the seam 3 at the outer edge of the overlying portion 2a, and since the rib 5 is relatively stiff, whereas the emitter elements 4, constituting the relatively elastic formation, are pressure-deformable, the increase in pressure within the hose 2 tautens the slack 6, and at the same time tends to move hose edges 2a, 2b in opposite directions, thereby applying a tangential or shear force to the emitter elements. Since these elements are of a relatively elastic or deformable material, this tangential force changes the shape of the turbulent flow passageways defined by them to change the resistance to flow. Thus, an increase in the pressure within the hose will compress the relatively elastic elements, to thereby reduce the cross-sectional area of the flow path, whereas a decrease in the hose pressure will permit the relative elastic elements to return to their original shapes.

It will thus be seen that in this construction the pressure-compensation is effected by two forces, namely: the tangential force tending to change the shape of the turbulent flow passageway; and the compressional force tending to reduce the cross-sectional area of the flow path. The above two forces actually act in parallel, but the tangential force is predominant in the lower pressure ranges until the slack 6 is taken-up, whereupon the compressional force becomes predominant in the higher pressure ranges.

The foregoing is illustrated in FIG. 3, wherein line O-Z illustrates the flow without pressure-compensation, line O-X illustrates the pressure-compensation in the lower pressure ranges primarily by the above-described tangential force, and line X-Y illustrates the pressure compensation in the higher pressure ranges primarily by the above-described compressional forces.

The movement of hose edges 2a, 2b in opposite directions will also tend to dislodge clogging particles thereby decreasing the sensitivity of the drip irrigation hose to clogging.

FIG. 4 illustrates a variation in the construction of the seamed hose, therein generally designated 102. In this variation, the seam 103 is also produced by the overlapping edge portions 102a, 102b bonded together both by the relatively elastic formation, namely the emitter elements 104, and by the relatively inelastic stiff formation, namely the longitudinally-extending rib 105; but here the rib 105 is of less height than the emitter elements 104 in the non-pressurized condition of the hose 102, as shown in FIGS. 4 and 4a. However, as soon as the hose 102 is pressurized, the hose tends to tauten and to move the overlapping hose ends 102a, 102b in opposite directions, to apply tangential or shear forces to the emitter elements 104 and thereby to change the turbulent flow passageways defined by the emitter elements. Accordingly, after the initial pressurization of the hose, the emitter elements will become more or less stressed in shear, according to the pressure changes of the water within the hose, to change the effective cross-section of the flow paths, and thereby to change the sensitivity of the water discharge rates from the emitter elements, in response to changes in pressure of the water within the hose, as described above with respect to FIGS. 1–3.

Figure 5A:
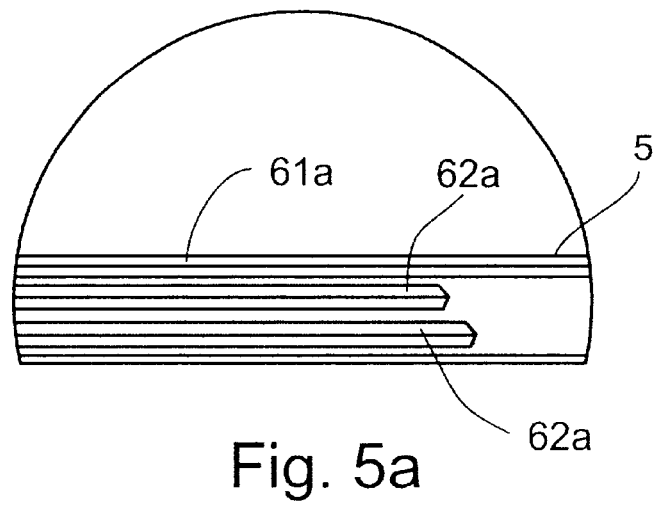
Figure 5B:
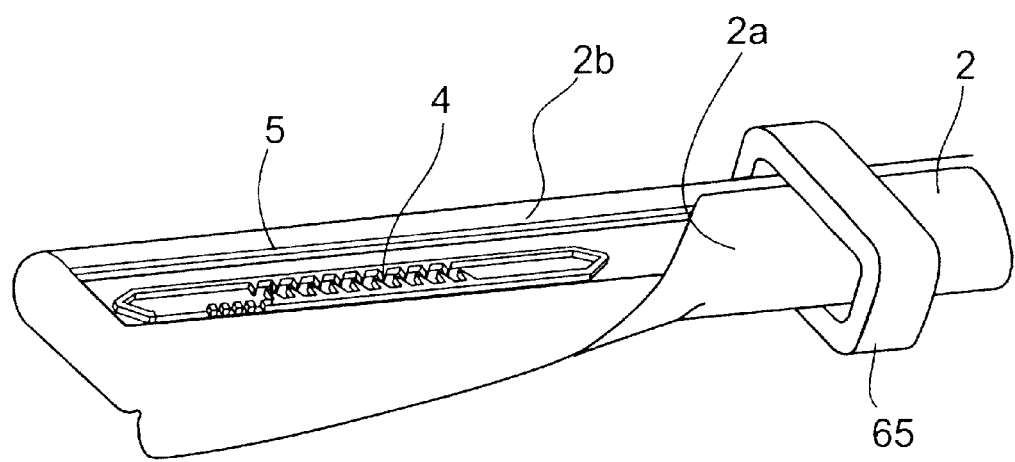

FIGS. 5, 5a and 5b illustrate one manner of producing the drip irrigation hose of FIGS. 1 and 2, which method can also be used for producing the hose of FIG. 4.

Thus, as shown in FIG. 5, the initial sheet 2 of thin flexible plastic material is fed from a supply roll 60 past two extruders 61, 62 within a common cross-head CH as used in co-extrusion of two different materials. Extruder 61 extrudes a continuous strip 61a (FIG. 5a) of the relatively inelastic material which defines the continuous rib 5 of the relatively stiff formation; whereas extruder 62 intermittently extrudes two strips 62a of the relatively elastic pressure-deformable material constituting the relatively elastic formation to be shaped by an embosser wheel 64 to define the longitudinally-spaced emitter elements 4. Strip 61a defining the rib 5, and the strips 62a to define the emitter elements 4, are both extruded adjacent to the outer edge portion 2b of the sheet 2.

The opposite edge portion 2a of the sheet 2 is engaged by a rotary wheel 63 which produces the slack 6 between the rib 5 and the emitter elements 4 as shown in FIG. 2a, for example. Extruder 61 operates continuously, while extruder 62 operates intermittently in synchronism with the embosser wheel 64.

Downstream of the embosser wheel 64 is a folding member 65 which folds the opposite end portions 2a, 2b of the sheet 2 and welds them together, with the rib 5 (61a, FIG. 5a) and the emitter elements 4 in-between, to produce the drip irrigation hose, as described above with respect to FIGS. 2 and 2a. Both the plastic emitter elements 4 and the continuous plastic rib 5 are thus utilized for securely welding the opposite edges of the sheet together to produce the seam 3.

The so-produced irrigation hose is then fed past a perforator, schematically shown at 66, for producing the discharge openings 48 (FIG. 1) aligned with the outlet end of each of the emitters 4, before being wound on a take-up reel 67.

Figure 5C:
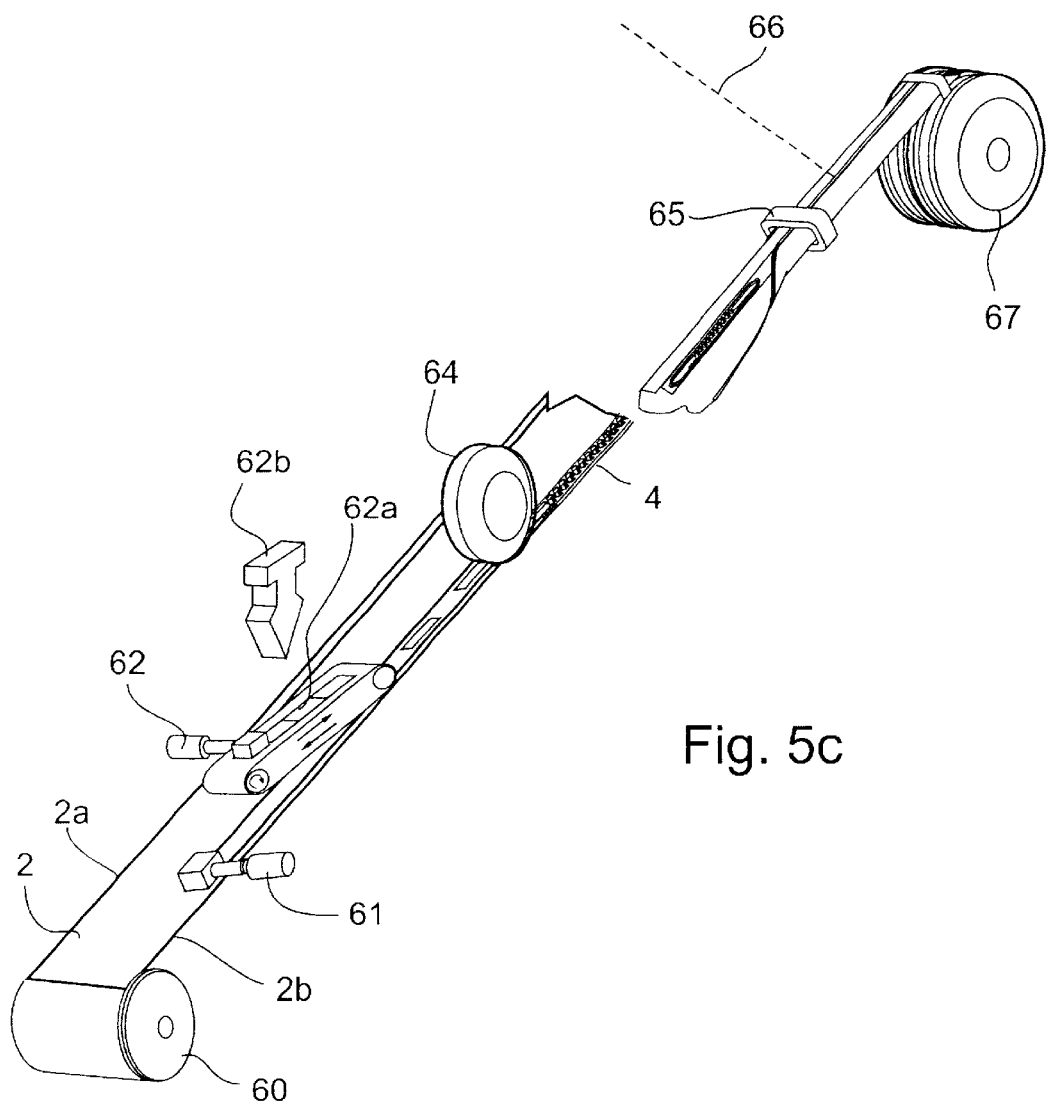

FIG. 5c illustrates a modification in the apparatus of FIG. 5. Whereas in FIG. 5, extruder 62 extrudes the relatively elastic material in an intermittent manner to produce the interrupted strips, in the modification illustrated in FIG. 5c, extruder 62 extrudes this material in a continuous manner onto a belt 62a as it travels at a lower speed than the hose sheet 2. The continuous strip on belt 62a is cut by a knife 62b into individual strips. Since belt 62a travels at a linear speed substantially less than that of sheet 2, that the higher speed of sheet 2 spaces the individual strips along the length of the sheet as they are bonded to the sheet before formed into the hose.

The apparatus of FIG. 5c otherwise is constructed and operates in the same manner as described above with respect to FIG. 5, and therefore the corresponding elements are identified by the same reference numerals as in FIG. 5.

FIGS. 6, 6a and 7 illustrate a modification in the construction of the drip irrigation hose, and also in the apparatus for producing it. Here, the flexible plastic sheet 202 is also fed past a pair of extruders 261, 262, feeding the cross-head CH, but in this case one extruder 262 extrudes a continuous strip 262a (FIG. 7) of the relatively elastic plastic material (e.g., a thermoplastic elastomer) to constitute the relatively elastic formation; whereas the other extruder 261 extrudes two continuous strips 261a of the relatively inelastic material (e.g., polyethylene) on opposite side of strip 262a, as shown in FIG. 7. The embosser wheel 264 downstream of the two extruders 261, 262 is located to emboss mainly the outer polyethylene strips 261a to form the emitter elements 204 of the same structure as described above with respect to FIGS. 1 and 1a, except that in this case the teeth of the emitter elements 204 are made of the relatively inelastic polyethylene and overlie a continuous strip 262a of the relatively elastic elastomer, as shown particularly in FIG. 7. The remainder of the process for producing the drip irrigation hose illustrated in FIGS. 6, 6a and 7, is otherwise the same as described above with respect to FIGS. 5 and 5a.

It will be appreciated that the drip irrigation hose produced according to FIGS. 6, 6a and 7 do not have the continuous rib 5 of he relatively inelastic material or the slack 6. Rather, the emitter elements 4 will be produced from the relatively inelastic material (polyethylene) strips 261a which are embossed to define the teeth (corresponding to 45, 46, FIGS. 1, 2) of the emitter elements overlying the pressure-deformable strip 262a of the relatively elastic material. An increase in the water pressure within the hose will press the relatively elastic material 262a into the spaces between the teeth of the relatively inelastic material 261a, whereas a decrease in the water pressure will withdraw the relatively inelastic material from the space between the teeth. Accordingly, layer 262a of the relatively inelastic material will act to change the effective cross-sectional areas of the flow passageways defined by these emitter elements, and thereby to decrease the sensitivity of the water discharge rates, in response to changes in the pressure of the water within the hose.

FIG. 8 illustrates another construction of the drip irrigation hose which may also be produced by the apparatus described above with respect to FIGS. 6, 6a. In this case, the two extruders 361 and 362 are also arranged such that two strips of the relatively inelastic material 361a, to constitute the relatively stiff formation, are applied over the thermoplastic elastomeric layer 362a (FIG. 8a), to constitute the relatively elastic formation, as in FIGS. 6 and 7; but the embosser wheel 364 embosses both layers to define the emitter elements 304 (FIG. 8b). Thus, as shown in FIG. 8b the emitter elements 304 so produced would be of the same construction as described above with respect to FIG. 1, except that each of the elements (e.g., 41–46) of each emitter element 304 would be constituted of two layers, namely an outer layer 361a of the inelastic plastic material (e.g., polyethylene), and an inner layer 362a of the pressure-deformable thermoplastic elastomeric material. Changes in water pressure within the hose thus cause the elastomeric material 362a to be compressed to change the height of the teeth and thereby to produce the changes in the effective cross-sectional area of the emitter flow path in response to changes of pressure within the irrigation hose at the respective emitter outlet.

FIGS. 9, 9a and 9b illustrate another construction wherein the emitter elements, therein designated 404, are also applied by co-extrusion of two plastic materials onto the plastic sheet 402 to produce a composite strip. In this case, the emitters are produced by co-extruding two parallel strips, each including an upper layer of the relatively inelastic plastic material 461a, such as polyethylene, applied by extruder 461 and to constitute the relatively stiff formation; and a lower layer of the relatively elastic plastic material 462a, such as a thermoplastic elastomer, applied by extruder 462 and to constitute the relatively elastic formation. The embosser 464 is applied to the so-formed composite strip such that at least the outer tips of the teeth in each emitter element are constituted of the relatively elastic thermoplastic elastomer, as shown at 462a in FIG. 9b. Such a construction minimizes the amount of the more expensive elastomeric material used. In all other respects, the construction of the drip irrigation hose illustrated in FIGS. 9, 9a and 9b, and the manner of manufacturing it, are similar to the structures and methods described above.

Figure 10:
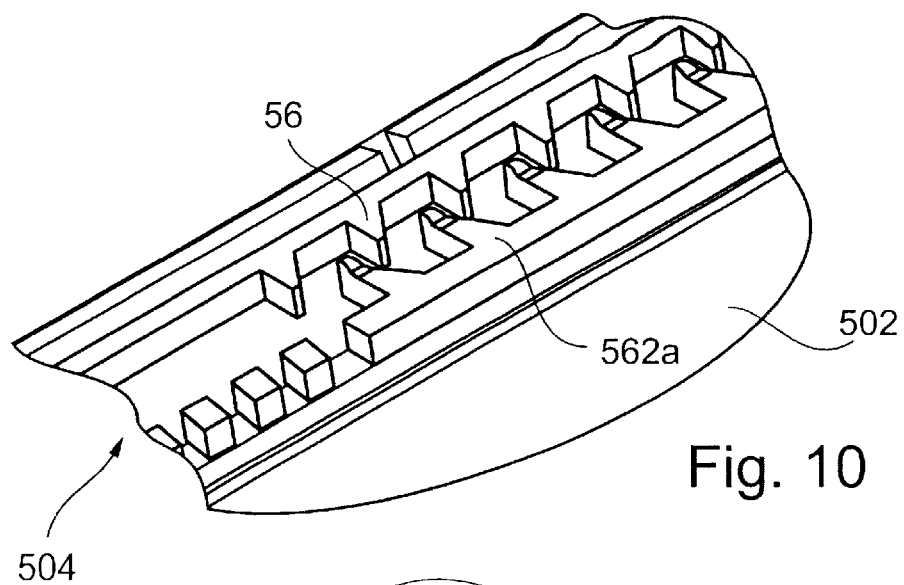
FIG. 10 illustrates yet another construction of the drip irrigation hose.
Figure 11:
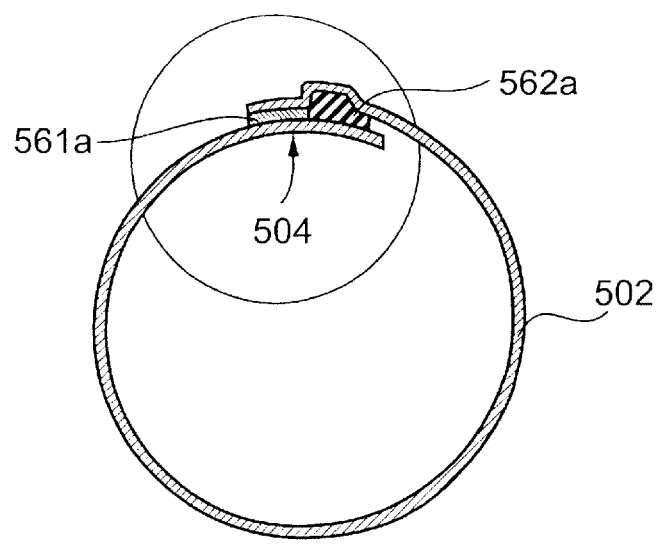
FIG. 11 is a transverse sectional view of a drip irrigation hose constructed according to FIG. 10, FIG. 11a being an enlarged fragmentary view of FIG. 11.
Figure 11A:
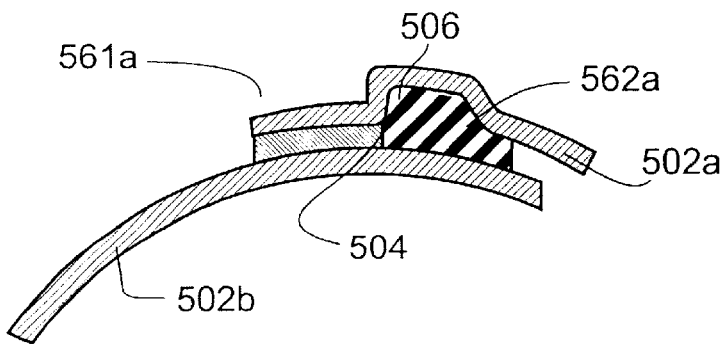

FIGS. 10, 11 and 11a illustrates another construction of the drip irrigation hose 502. In this construction, each of the emitter elements 504 deposited on the plastic sheet used for producing the hose 502 includes a strip of the relatively inelastic plastic material 561a on one side, and a strip of the relatively elastic material 562a on the opposite side, which strips are shaped by the embossing wheel (not shown) to produce the respective emitter element. Thus, as shown in FIGS. 10, 11 and 11a, one longitudinally-extending strip and its teeth are formed of the inelastic plastic material 561a (e.g., polyethylene), whereas the other longitudinally-extending strip and its teeth are formed of the elastic and pressure-deformable thermoplastic elastomeric material 562a to provide the pressure compensation in response to changes in pressure of the water conducted by the drip irrigation hose.

As shown particularly in FIG. 11, the teeth formed by the relatively elastic material 562a are of a greater height (thickness) than the teeth formed of the relatively inelastic material 561a. This produces the equivalent of a slack, shown at 506, in the hose 502, comparable to slack 6 in FIG. 2, which, when pressurized water is applied to the hose, permits the two edge portions 502a, 502b of the hose 502 to move apart, thereby applying a shear or tangential force to the emitter elements, particularly to teeth 562a of the relatively elastic material. This has the effect of changing the turbulent flow passageway defined by the opposing teeth, as well dislodging particles which may tend to have become clogged in that passageway, as described above particularly with respect to the embodiment of FIGS. 2 and 4.

FIGS. 12 and 12a illustrate a further construction, wherein the seam 703 of the hose 702 is bonded by and to both the emitter elements 704 and the continuous rib 705, similar to the arrangement of FIG. 2. In this case, however, the hose is not formed with a slack (corresponding to slack 6 in FIG. 2), but rather receives a strip of the relatively elastic material 762a to underlie the two strips of relatively inelastic material 761a applied thereover. The composite strip produced by the latter two strips is embossed, e.g., as shown in FIG. 6a. The elastic material 762a is pressure-compressible so as to be deformable into the space between the teeth of strip 761a, to change the effective cross-sectional area of the turbulent flow passageway, in response to changes in the water pressure, as described above with respect to FIG. 6b.

FIGS. 13 and 13a illustrate a modification similar to that of FIGS. 12 and 12a, except that the continuous rib 705 is omitted. Instead, the two strips of the inelastic plastic material 861 are applied to enclose the pressure-deformable elastic layer 862a, constituting the relatively elastic formation, similar to the arrangement described above with respect to FIGS. 6, 6a and 7.

Figure 14:
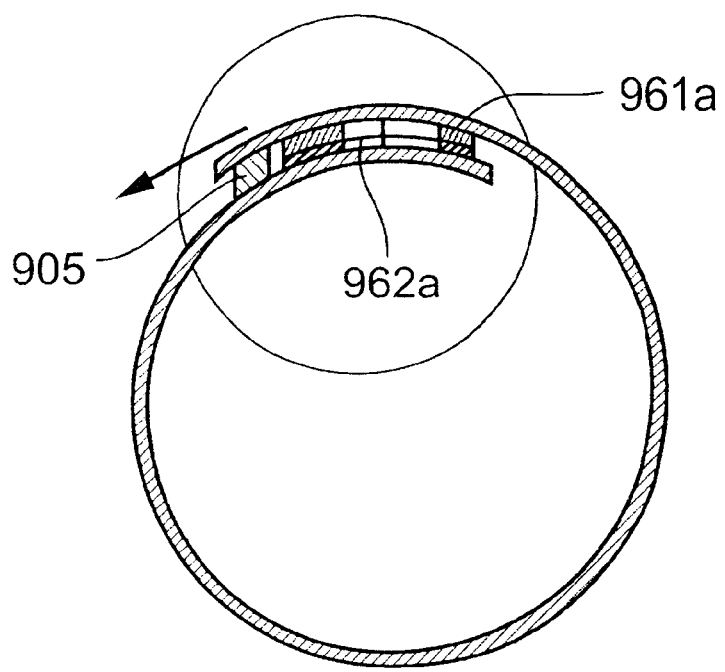
FIGS. 14 and 14a are views corresponding to those of FIGS. 13 and 13a but illustrating a further construction.
Figure 14A:
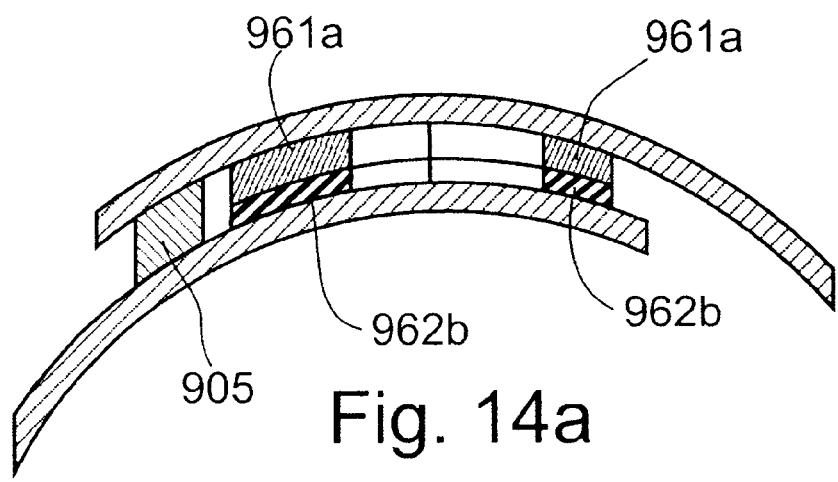

FIGS. 14 and 14a illustrate a further construction, similar to that of FIGS. 12 and 12a, except that in the construction of FIGS. 14 and 14a, the two overlying inelastic plastic strips 961a are applied so as to be co-extensive with the underlying elastic strips 962a, and the inelastic plastic rib 905 is initially spaced from all the strips 961a and 962a. Also, the resulting composite strip is embossed to form the teeth of the turbulent flow passageway, as described above with respect to FIGS. 8, 8a and 8b.

While all the above constructions are described as embodied in a seamed-type drip irrigation hose, it will be appreciated that some or all of such constructions could also be embodied in a seamless drip irrigation hose, such as one produced by extrusion. FIGS. 15–25 illustrate examples of such constructions.

Figure 16:
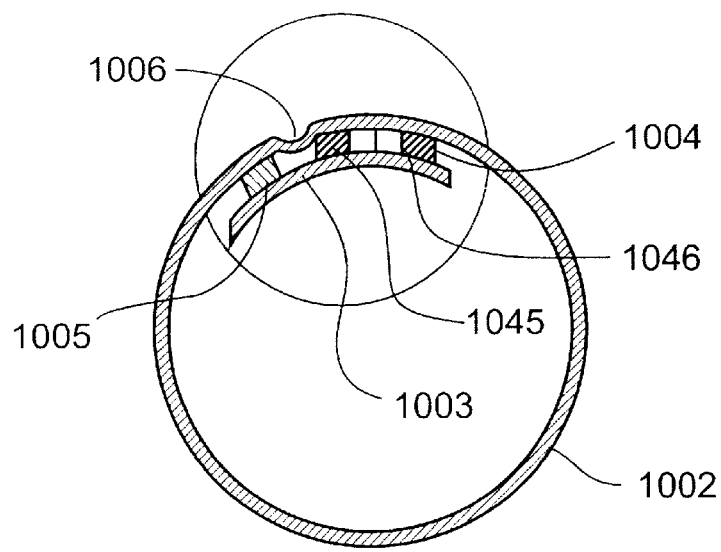
Figure 16A:
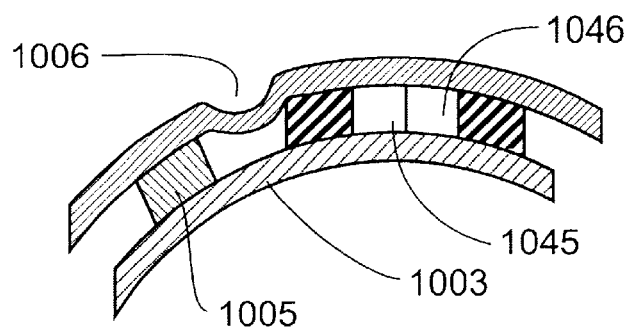

Thus, as shown in FIGS. 15 and 16, a continuous unseamed tube 1002 is produced by extrusion, and concurrently with the extrusion, a strip 1003 of emitter elements 1004, concurrently or previously produced by co-extrusion and embossment, is bonded to the inner face of the extruded tube. As particularly shown in FIGS. 15a and 15b, a composite strip 1003 is formed with a continuous rib 1005 of the relatively inelastic material (corresponding to rib 5 in FIG. 2) to constitute the relatively stiff formation of the composite strip, and with a plurality of emitter elements 1004 each including a pair of longitudinally-extending strips 1041, 1042, of the relatively elastic material to constitute the relatively elastic formation. The latter strips are closed at the opposite ends by transversely-extending strips 1043, 1044 having the alternatingly projecting teeth 1045, 1046 to define the labyrinth-type turbulent flow passageway. One strip 1042 is formed with the inlet openings 1047 at one end of the labyrinth communicating with the interior of tube 1002. The opposite end of the labyrinth communicates with an outlet 1048 in the extruded tube 1002. Preferably, the continuous rib 1005 is formed with a plurality of transverse slots 1005a to provide communication with the interior of the tube 1002, and to equalize the pressure on both sides of the rib since, in this case, the bottom of the rib is covered by the continuous strip 1003.

In order to enhance the pressure compensation for the turbulent flow passageways in response to changes in the water pressure, a slack 1006 is produced in the extruded tube 1002 between the continuous rib 1005 and the emitter elements 1004, as described above with respect to the construction of FIGS. 1 and 2. For the same reasons, the rib 1005 is preferably made of a relatively inelastic plastic material, such as polyethylene, whereas the emitter elements 1004 are made of the relatively elastic material, such as a thermoplastic elastomer. The extruded tube 1002 may also be of polyethylene.

Figure 16B:
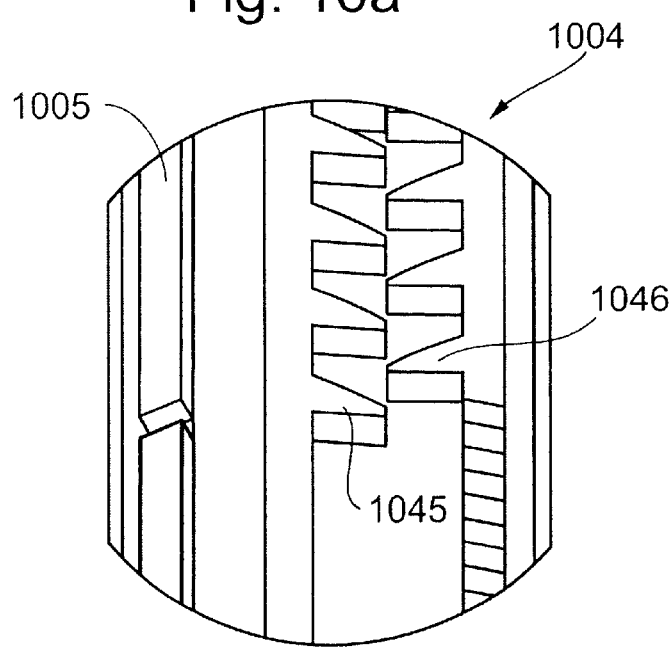

FIGS. 16–16b illustrate the normal non-pressurized condition of the emitter elements 1004, i.e., before the slack 1006 has been taken up by the initial pressure. In this condition the teeth 1045, 1046, made of the elastomeric material, terminate substantially along the center line of the labyrinth flow path defined by those teeth (see FIG. 16b).

Figure 17:
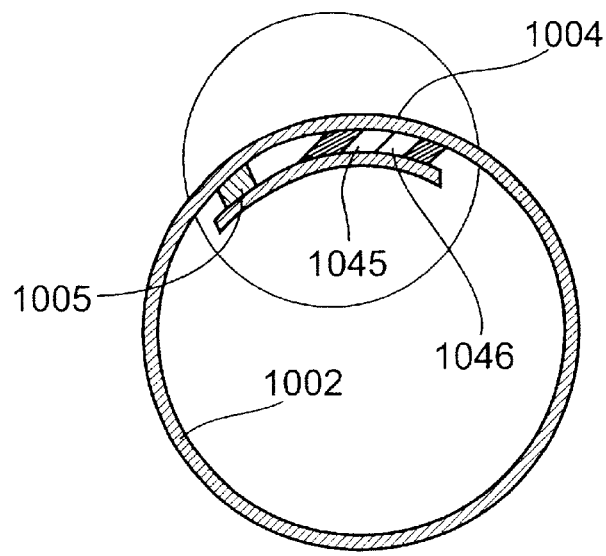
FIGS. 17, 17a and 17b are corresponding views illustrating the emitter of FIGS. 16, 16a and 16b under pressure.
Figure 17A:
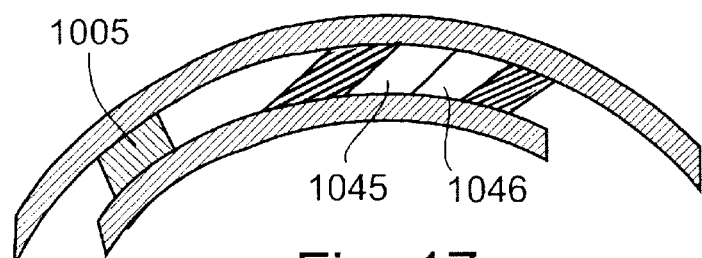
Figure 17B:
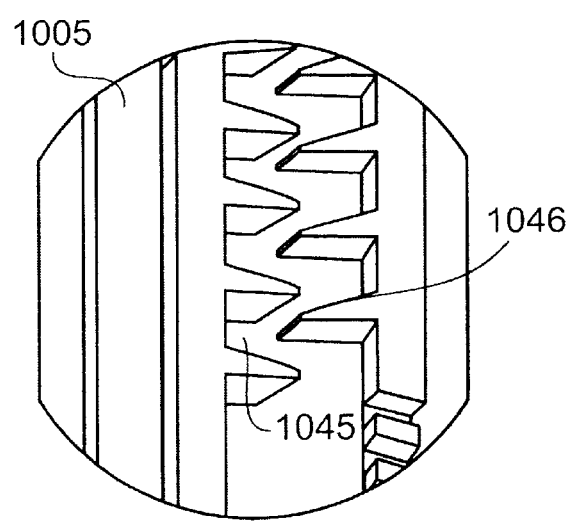

FIGS. 17, 17a and 17b illustrate the condition of the emitter elements after the hose has been pressurized so as to remove the slack 1006, and thereby to enable the emitter elements 1004 to control the turbulent flow passageway in order to compensate for changes in pressure of the water in the hose. Thus, an increase in the water pressure will produce a tangential face tending to deform the teeth 1045, 1046, such that the teeth will project past the center line, changing the shape of the cross-sectional area of the flow path and increasing the resistance to flow. A decrease in the water pressure will produce the opposite effect. The foregoing effects are substantially the same as occurring with respect to the constructions of FIGS. 1, 2, and 4. As described above, they enable the emitter elements 1004 to change the labyrinth flow path in order to regulate the water flow therethrough to compensate for changes in the water pressure.

Figure 18:
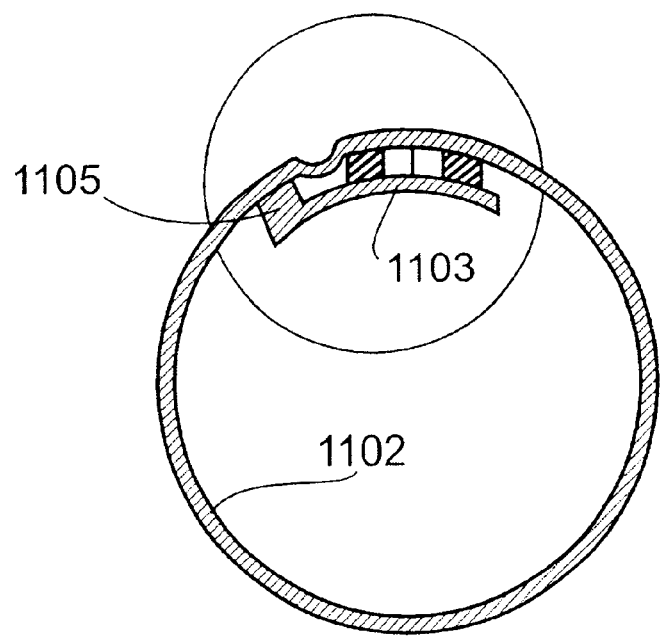
FIG. 18 illustrates a still further construction, FIG. 18a being an enlarged sectional view of FIG. 18, FIG. 18b being a perspective view illustrating the irrigation hose of FIG. 18, and FIG. 18c illustrating one of the emitter elements in the hose of FIG. 18.
Figure 18A:
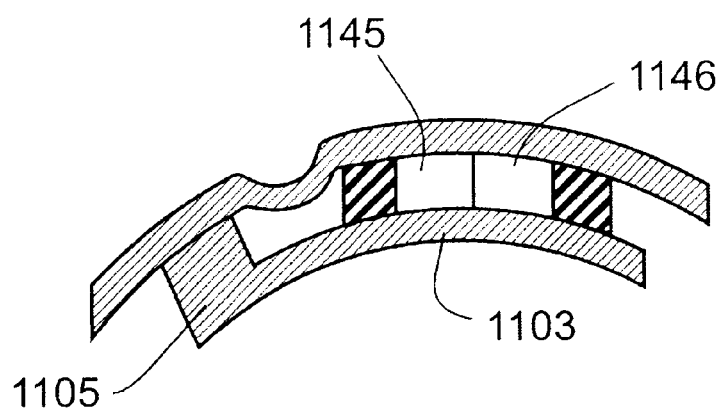
Figure 18B:
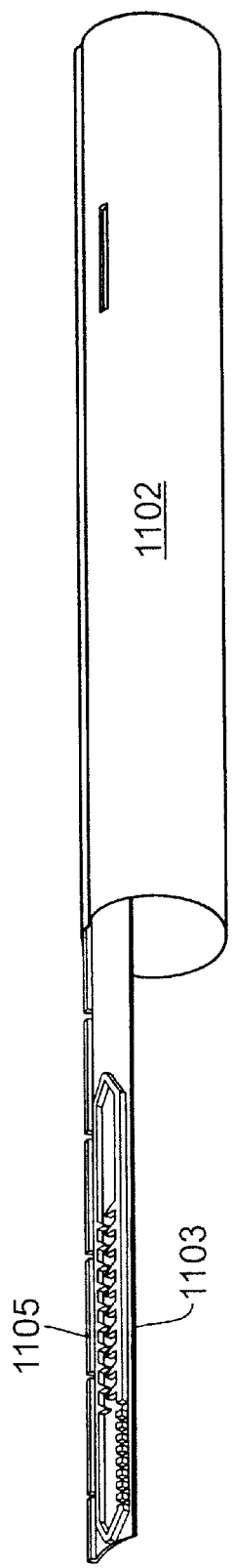
Figure 18C:
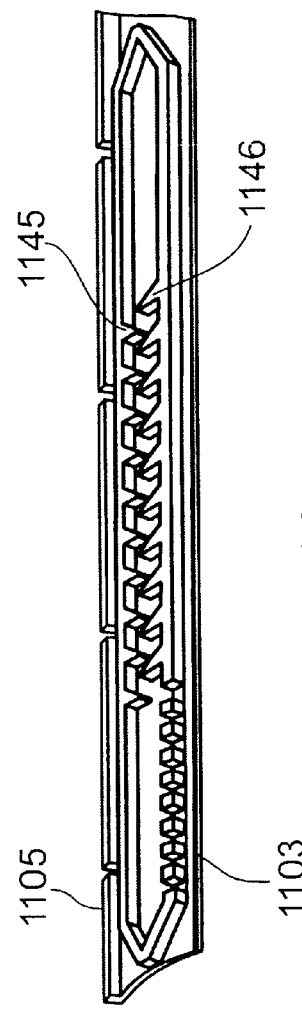

FIGS. 18 and 18a–18c illustrate a modification in such a construction, wherein the continuous rib 1105 is integrally formed with the emitter strip 1103 of relatively inelastic material, e.g., polyethylene. In all other respects, the drip irrigation hose 1102 of FIGS. 18 and 18a is constructed as described above to include the flow-regulating labyrinth defined by teeth 1145, 1146 of relatively elastic material.

Figure 19:
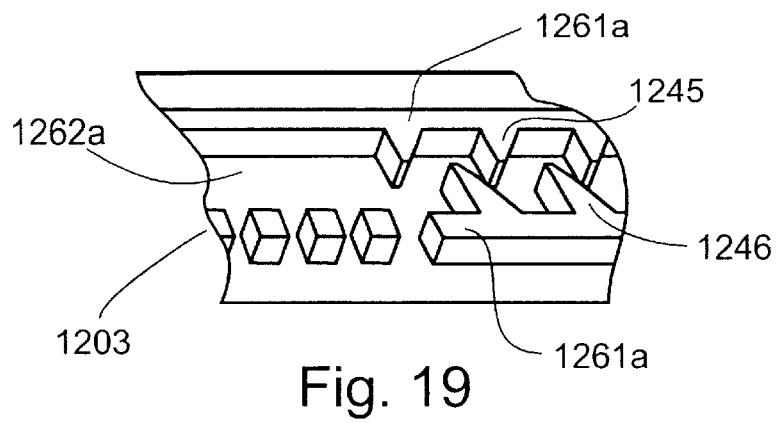
FIG. 19 is a fragmentary view illustrating a still further construction, FIG. 19a being a sectional view thereof.
Figure 19A:
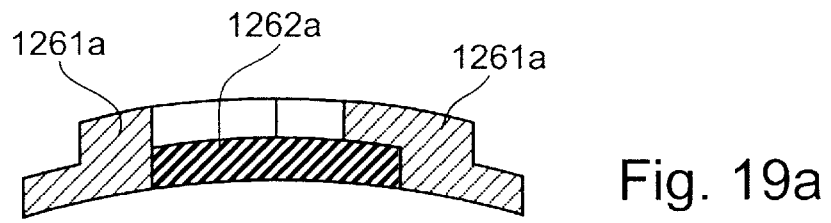

FIGS. 19 and 19a illustrate a composite emitter strip 1203 for application to an extruded tube (not shown), which emitter strip is similar to the construction described above with respect to FIGS. 6 and 7 for a seamed tube. Thus, in the construction illustrated in FIGS. 19 and 19a, the composite emitter strip 1203 includes a relatively elastic formation in the form of an underlying layer 1262a of the elastomeric material, and a relatively stiff formation constituted of two lateral strips 1261a of the relatively inelastic plastic material formed with the teeth 1245, 1246 defining the turbulent labyrinth flow path. Such an emitter strip may be produced by co-extrusion of the two materials followed by embossing the teeth, either before the extrusion of the outer tube, or concurrently with the extrusion of the outer tube to which the emitter strip is bonded.

Figure 20:
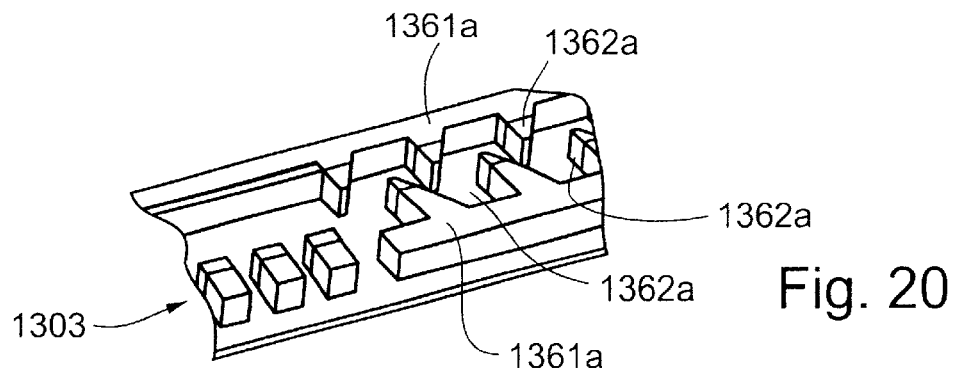
FIG. 20 is a fragmentary view illustrating a still further construction, FIG. 20a being a sectional view thereof.
Figure 20A:
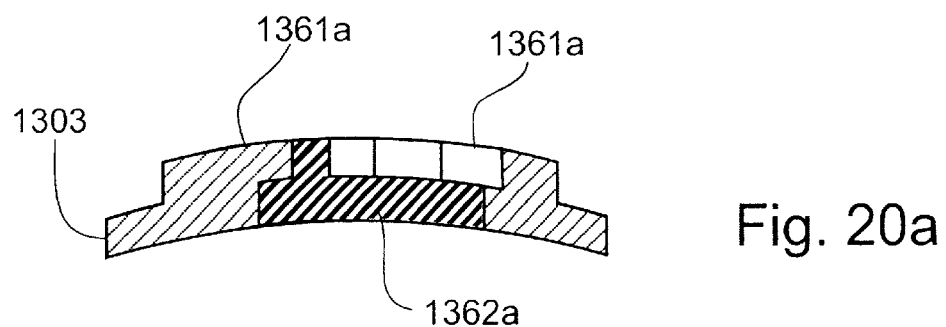

FIGS. 20 and 20a illustrate a composite emitter strip, therein designated 1303, constructed as in FIGS. 19 and 19a, except that in this case, the tips of the teeth, as well as the bottom strip, are constituted of the elastomeric material, shown at 1362a, whereas the longitudinally-extending strips and the bases of the teeth are partially made of the relatively inelastic plastic material, as shown at 1361a.

FIG. 21 illustrates a similar construction except that only the tips of the teeth are made of the elastomeric material, as shown at 1462a, whereas the remainder of each emitter element 1404 in the emitter strip 1403 is made of the relatively inelastic plastic material, as shown at 1461a. The latter construction minimizes the use of the more costly elastomeric material.

Figure 22A:
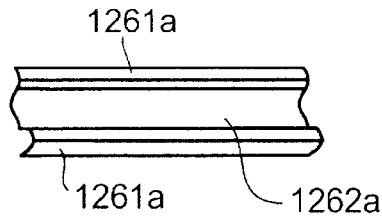
FIG. 22 illustrates a further modification in the method of making the drip irrigation hose, FIG. 22a illustrating the co-extruded strips before embossment, FIG. 22b illustrating them after embossment, and FIG. 22c being a section of the emitter strip after embossment.
Figure 22B:
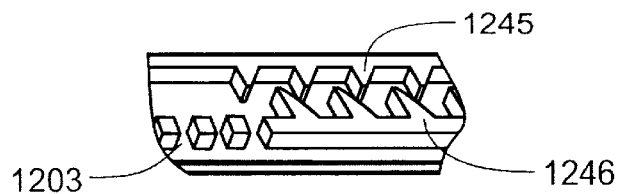
Figure 22C:
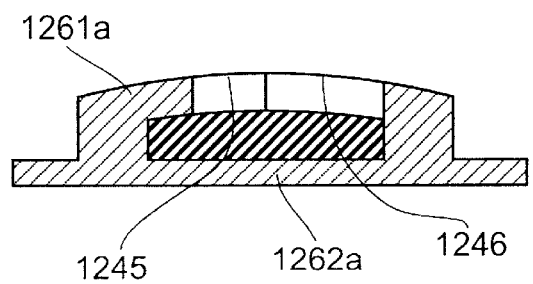

FIG. 22 illustrates a method and apparatus for producing a drip irrigation hose according to the construction described above with respect to FIGS. 19 and 19a, although it will be appreciated that the same method and apparatus could be used for the other constructions described above wherein the hose is produced by extrusion. Thus, as shown in FIG. 22, a composite emitter strip 1203 is produced by co-extrusion from a first extruder 1261 extruding two strips 1261a (FIG. 22a) of the relatively inelastic material along the opposite sides of a strip of the relatively elastic material 1262a extruded by the second extruder 1262. The so-produced composite strip is then embossed by embossing wheel 1264 to form the teeth 1245, 1246, as shown in FIGS. 22b and 22c, before the strip 1203 is received within the cross-head 1265a of the extruder 1265 which extrudes the plastic tube 1202 thereover. The illustrated apparatus may use conventional techniques for shaping the plastic tube 1202 extruded by extruder 1265, bonding to its inner surface the composite emitter strip 1203, and perforating the tube with the outlet openings by perforator 1266.

Preferably, the emitter strip 1203 is extruded and formed with the extrusion of the plastic tube 1202, but can be done separately before the extrusion of the tube.

Figure 23:
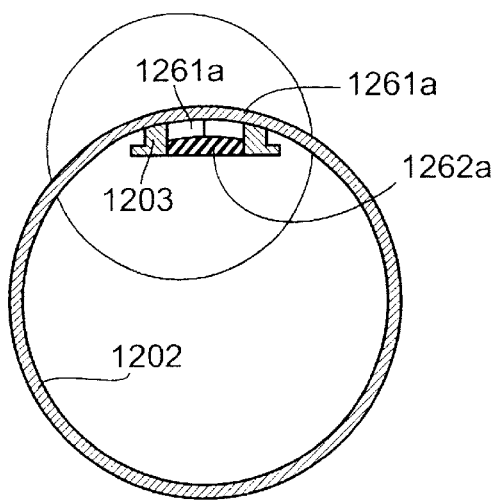
FIGS. 23 and 23a is a sectional view, and an enlarged fragmentary view, respectively, illustrating the hose made according to the method of FIG. 22.
Figure 23A:
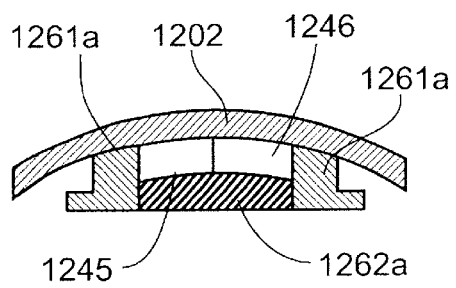

FIGS. 23 and 23a illustrate the resulting structure, including the plastic tube 1202 having the composite emitter strip 1203 bonded to its inner surface, with the elastomeric layer 1262a of the emitter strip exposed to the water pressure within the tube. Thus, an increase in the water pressure within the tube will press the elastomeric material 1262a, constituting the relatively elastic formation, into the labyrinth flow path defined by the teeth 1245, 1246 of the relatively inelastic material 1261a constituting the relatively stiff formation, to thereby increase the resistance to flow through the labyrinth; whereas a decrease in the water pressure will act oppositely to decrease the resistance to flow through the labyrinth.

Figure 24:
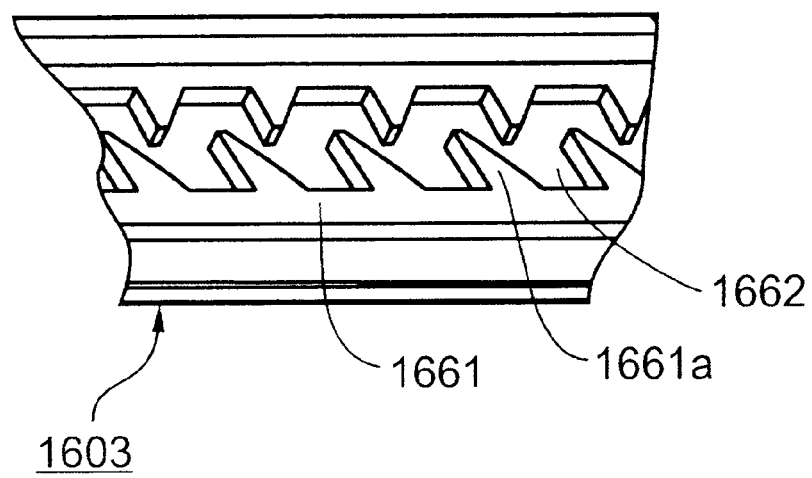
FIG. 24 is a fragmentary perspective view.
Figure 24A:
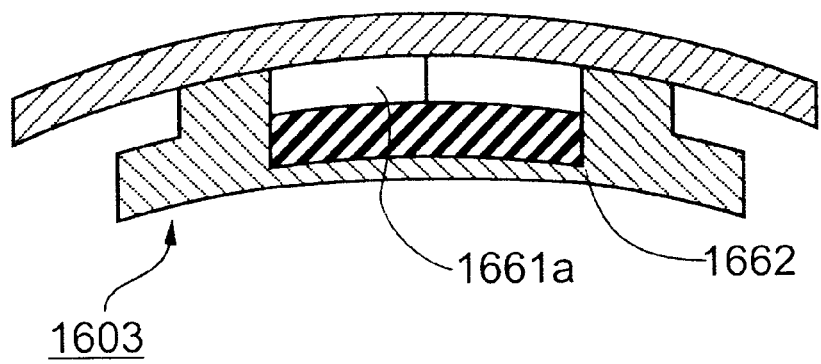
FIG. 24a is a transverse sectional view when the emitter element is attached to the hose, illustrating a further modification in the construction of the emitter elements.

FIG. 24, and its sectional view FIG. 24a, illustrate a further construction of the emitter element 1603, wherein the relatively inelastic material 1661 is formed with teeth 1661a defining turbulent flow passageways, and with an underlayer 1661b; and the relatively elastic material is in the form of an elastic strip 1662 between the teeth 1661a and the underlayer 1661b. In this construction, the relatively inelastic material, as well as the extruded tube, may be made of polyethylene, and the relatively elastic material may be an elastomer which need not bond well with the polyethylene since the overlying teeth of the polyethylene retain the elastomeric strip in place between the teeth 1661a and the underlayer 1661b.

Figure 25:
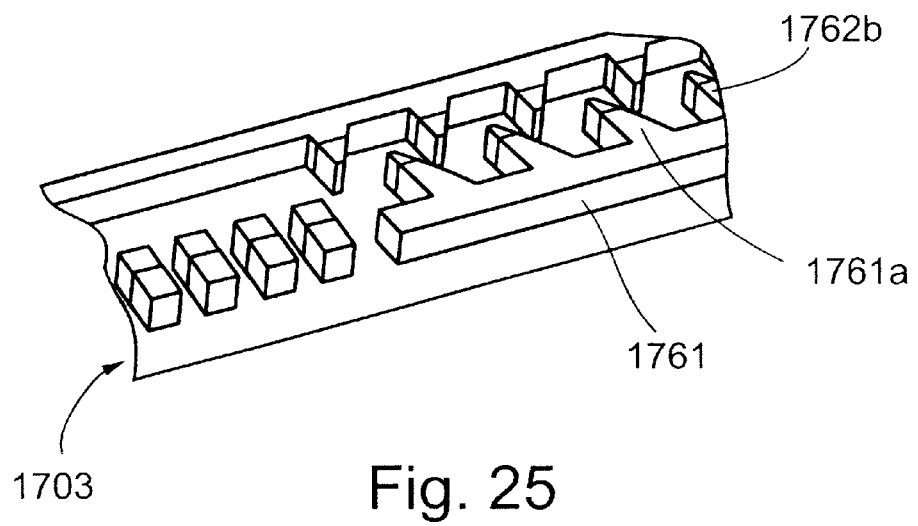
FIG. 25 is a fragmentary perspective view.
Figure 25A:
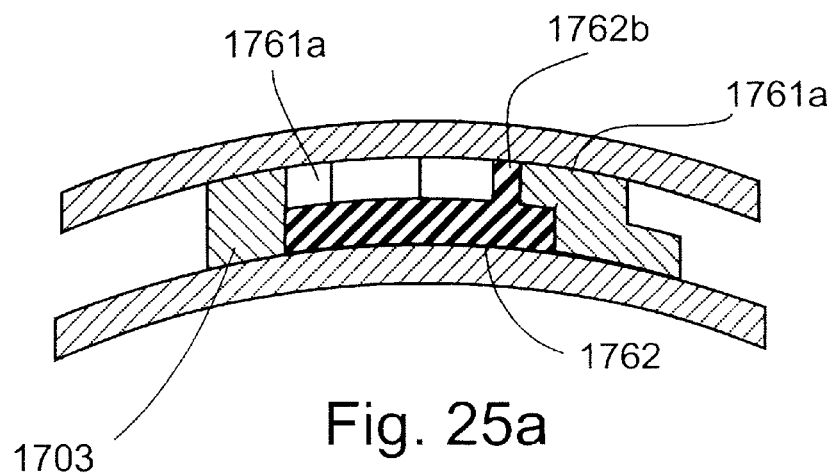
FIG. 25a is a transverse sectional view when the emitter element is attached to the hose, illustrating a still further modification in the construction of the emitter elements.

FIG. 25, and its sectional view 25a, illustrate a still further construction of emitter element 1703. In this case, the relatively inelastic material 1761 is in the form of teeth 1761a defining turbulent flow passageways, and the relatively elastic material includes an elastic strip 1762 underlying the teeth 1761a and the tips 1762a of the teeth of the teeth 1761a.

Figure 26:
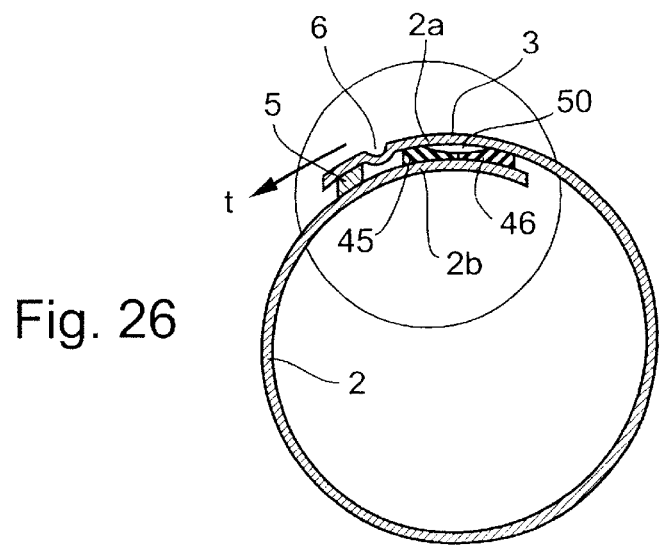
FIG. 26 is a sectional view illustrating a modification wherein the drip irrigation hose is formed with a clearance serving as a bypass of the labyrinth in each emitter element in the non-pressurized condition of the hose.
Figure 26A:
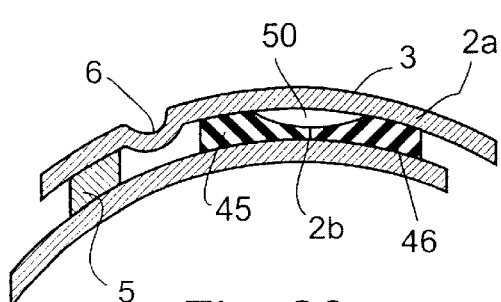
Figure 26B:
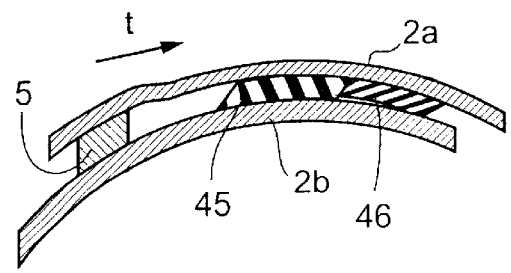
FIG. 26b is a corresponding view showing the closing or disappearance of the clearance in the pressurized condition of the hose.

FIGS. 26, 26a, 26b illustrate a drip irrigation hose similar to that described in FIGS. 1–4, and therefore to facilitate understanding, the corresponding parts are identified by the same reference numerals.

One important difference in the construction of the drip irrigation hose illustrated in FIGS. 26, 26a, 26b is the provision of a bypass clearance, shown at 50 in FIGS. 26 and 26a, between the inner face of the plastic tube 2 and the tips of the teeth 45, 46 of relatively elastic material defining the labyrinth producing the turbulent flow passageway for the water through the emitter element. As shown in FIG. 26a, the tips of the teeth 45, 46 are reduced in height so as to produce, in the non-pressurized condition of the hose, a clearance 50 which bypasses the labyrinth defined by all the teeth 45, 46, such that a laminar flow will be produced through clearance 50 bypassing the turbulent flow in the labyrinth defined by the teeth. However, as shown in FIG. 26b, when the hose is pressurized, clearance 50 is closed by the deformation of the teeth, thereby removing the laminar bypass flowpath via clearance 50, and forcing the water to flow through the turbulent flowpath of the labyrinth defined by teeth 45, 46.

Figure 27A:
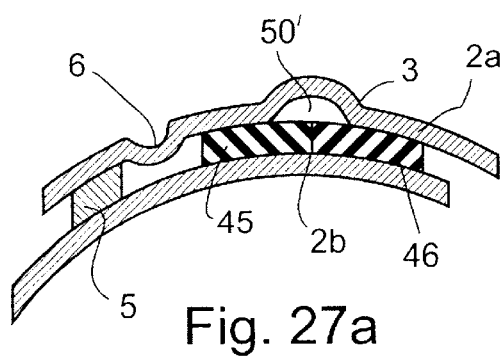
FIGS. 27a and 27b are views corresponding to those of FIGS. 26a and 26b, respectively, but illustrating another arrangement for producing the bypass clearance in the non-pressurized condition of the hose.
Figure 27B:
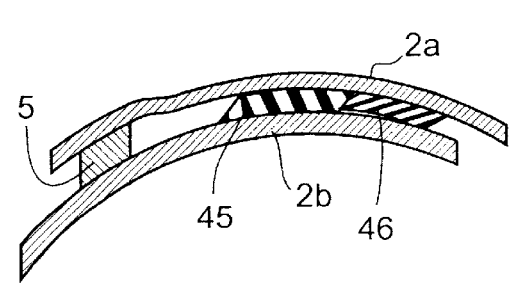

FIGS. 27a and 27b are views corresponding to FIGS. 27a and 27b but illustrating a modification in the construction of the hose to produce similar results. Thus, as shown in FIG. 27a, the clearance 50', corresponding to clearance 50 in FIG. 26, is produced in the non-pressurized condition of the hose by providing a longitudinally-extending slack in the outer tube 2, rather than by decreasing the height of the teeth 45, 46 as in FIG. 26. However, as shown in FIG. 27b, when the hose is pressurized, outer tube 2 is tautened such that clearance 50' of FIG. 27a is closed, thereby also removing the laminar-flow bypass of the labyrinth defined by the teeth 45, 46, in the same manner as described above with respect to FIG. 26.

Figure 28:
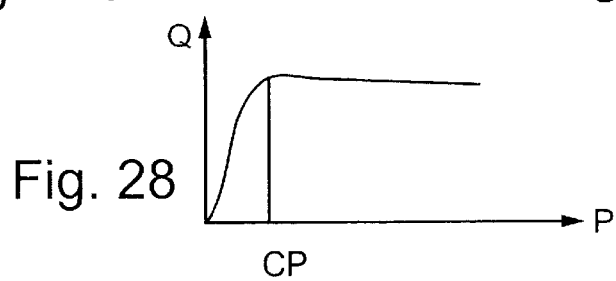
FIG. 28 is a curve illustrating the pressure/flow-rate relationship shown in FIG. 3 but applied to the latter modifications including a bypass clearance.

The constructions of FIGS. 26 and 27 also produce a rapid build-up in the flow through the outer tube 2 with an increase in pressure, and thereafter a relatively uniform flow with an increase in pressure, as described above with respect to FIG. 3. This is shown in FIG. 28, wherein "CP" represents the pressure at which the clearance (50 or 50') closes. In such a construction, the slack 6 (FIG. 26a, 27a) can be omitted.

Figure 29:
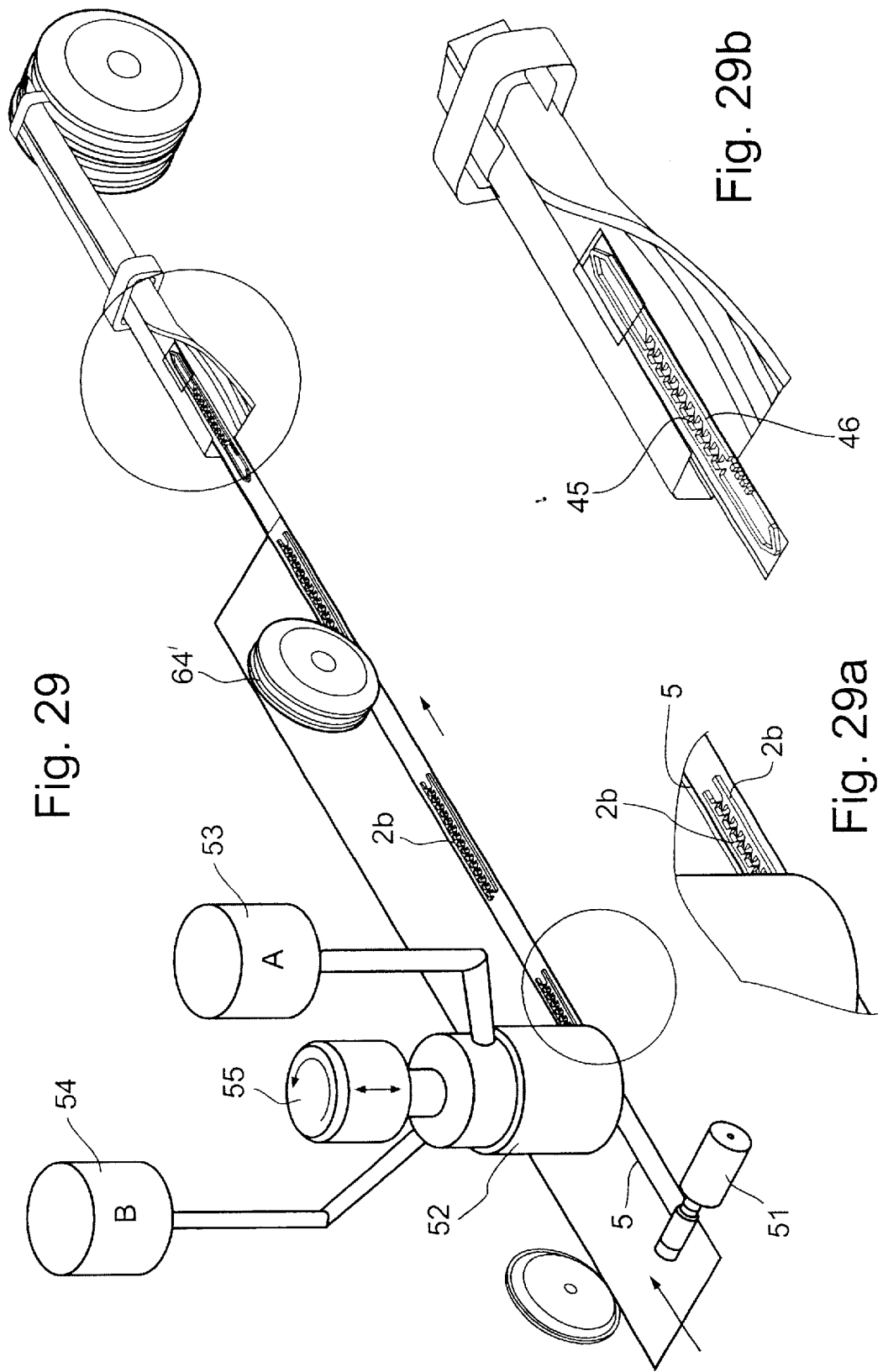
FIG. 29 illustrates apparatus corresponding to that shown in FIG. 5 but wherein the relatively elastic material is produced by cross-linking two liquids.

FIGS. 29, 29a and 29b generally correspond to the above-described FIGS. 5, 5a and 5b for making the drip irrigation hose but illustrate a modification in the method of making such a hose. In this modification, the continuous rib 5 may be of the relatively inelastic material, such as polyethylene, extruded by extruder 51. However, the relatively elastic material of the emitter elements is of a silicone rubber made of two materials, each originally in a liquid state, but capable of being cured into a solid state by cross-linking when mixed together in a heater-mixer. The cross-linking curing process produces a relatively elastic solid material which is thermosetting in nature. Such thermosetting material may not bond well to the polyethylene of the plastic tube in the produced drip irrigation hose, and therefore an adhesive coating is preferably applied to enhance the bonding as described below with reference to FIGS. 35–40b.

The cross-linking curing process depends on time and temperature. For example, the curing can be effected in 30 seconds at 230° C., or in 2 minutes at 150° C. In the process of FIG. 29, the conditions of time and temperature in the heater-mixer are such that only a part of the curing takes place therein. The remainder of the curing takes place later after the intermittently formed strips exit from the heater-mixer.

Thus, as shown in FIG. 29, the two materials (A, B) producing the relatively elastic material is supplied to a heater-mixer 52 from two liquid sources 53, 54 in liquid form. The two liquids are mixed and heated to a temperature lower than the normal recommended curing temperature.

The cross-linking begins in the heater-mixer 52. The partially-crosslinked product is forced out by a piston 55 intermittently onto the moving surface of the polyethylene strip 2 to define the composite strip. The composite strip is embossed by the embossing wheel 64 to produce the teeth 45, 46 of the emitter elements. It will be appreciated that the so-produced composite strip will include the relatively elastic formation including the teeth 45, 46 defining turbulent flow passageways which regulate the flow in response to pressure, and the relative inelastic rib 5 laterally of the teeth. It will also be appreciated that the embossing wheel 64 is only one way for making the teeth of the labyrinth defining the control passageway.

One example of the two liquid materials that can be used for making the relatively elastic emitter elements is "Elastosil" (Reg. TM) LR 3153 A,B, supplied by Wacker Silicone. These liquid materials, when mixed and cured by cross-linking, produce a solvent-free, thermosetting, silicone rubber particularly useful for coating textile-braided cables. While the mixture is normally cured (cross-linked) by a high temperature applied for a short time, in the present case it is preferably only partially cured by the heat in the heater-mixer 52, the curing being completed subsequently over a period of time. The embossing wheel 64 may also be heated to enhance the cross-linking. In this construction, it is not necessary that the teeth of the silicone rubber be firmly welded to the plastic tube.

Figure 30:
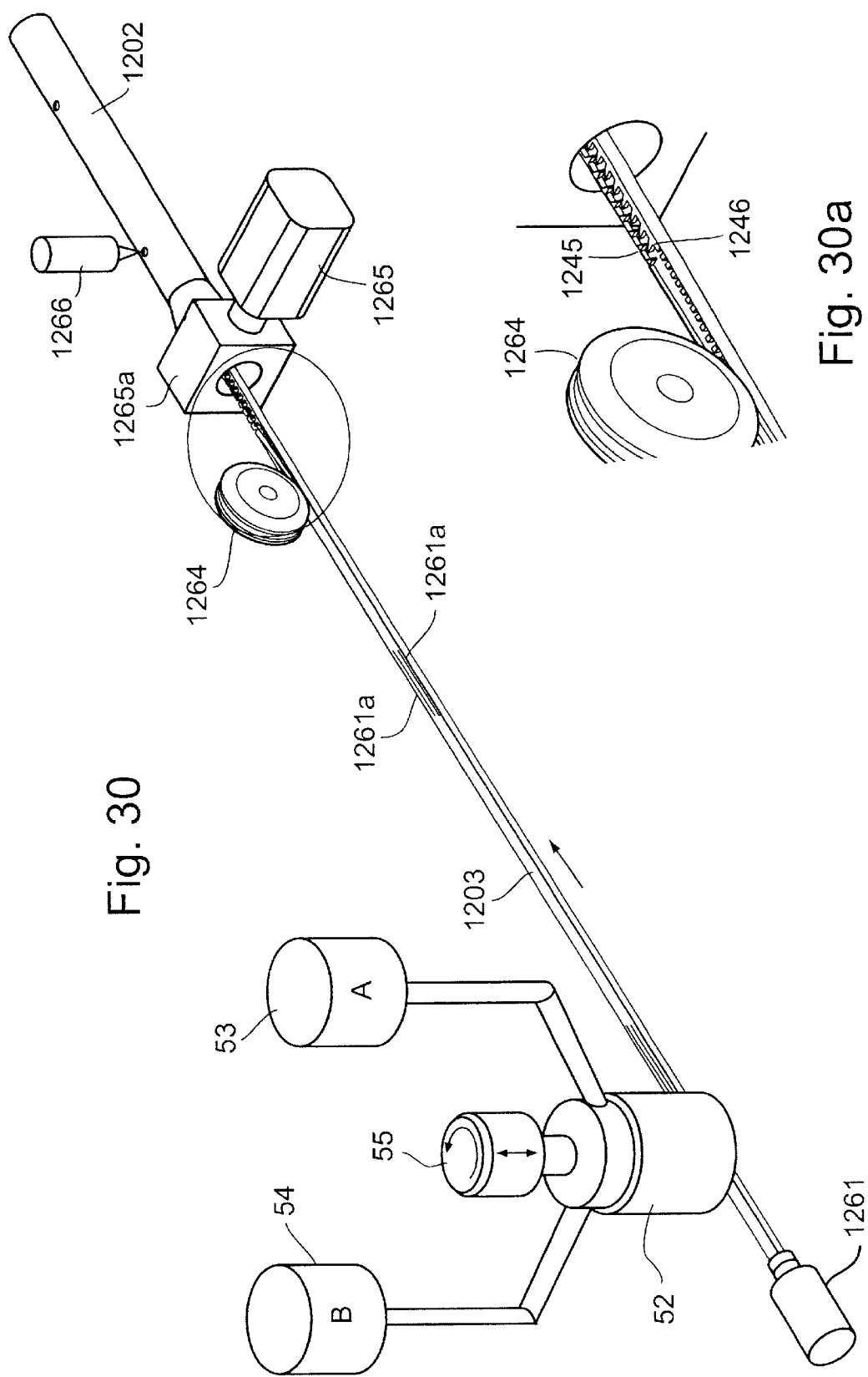
FIG. 30 illustrates apparatus corresponding to that of FIG. 22 wherein the relatively elastic material is produced by cross-linking two liquids.

FIG. 30 illustrates a similar process for producing a drip irrigation hose in which the outer tube 1202 is of the seamless type, as described for example in FIG. 22. To facilitate understanding, the same reference numerals are used, except that the relatively elastic material is of the cross-linked silicon rubber, as described above with respect to FIG. 29. This material is applied to the strip 1203 of inelastic material, exiting from its extruder 1261, by the heater-mixer 52 supplied with the two liquid ingredients from the two sources 53, 54 illustrated in FIG. 29. The so-formed composite strip then passes through the crosshead 1265a of extruder 1265 which extracts the tube 1202 around the strip. In this case, the extrusion process also heats the silicone rubber and aids in the cross-linking thereof. FIG. 30a more particularly illustrates the teeth 1245, 1246 of th silicon rubber formed by the embossing wheel 1264.

Figure 31:
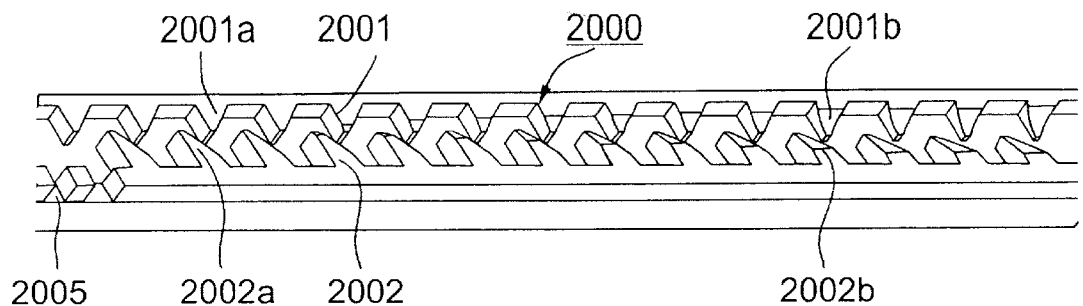
FIGS. 31 and 32 illustrate an emitter element in which the labyrinth includes sequentially-closing clearances from one port to the other to provide pressure-compensation in accordance with the description in my U.S. Pat. No. 5,400,973.
Figure 32:
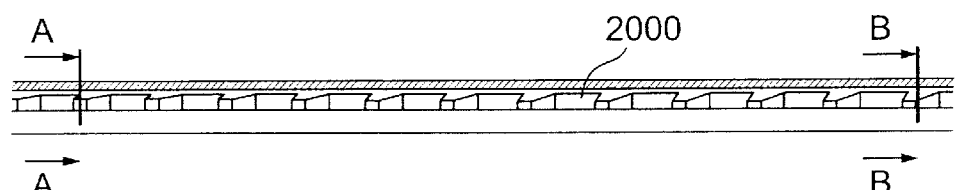

FIGS. 31 and 32 illustrate a modification in the construction of each of the labyrinths, therein designated 2000, in order to produce sequentially-closing clearances, in accordance with constructions described in my U.S. Pat. No. 5,400,973. Thus, as shown in FIGS. 31 and 32, the two rows of the teeth 2001, 2002, defining a turbulent flow passageway between them, including teeth 2001a, 2002a at one end having tips of fixed height, and teeth 2001b, 2002b at the opposite end having tips of progressively decreasing height.

Teeth 2001a, 2002a, thus define a fixed pressure-dropping labyrinth void of a bypass clearance to produce a fixed resistance to the water flow during both the unpressurized condition and pressurized condition of the hose.

On the other hand, teeth 2001b, 2002b define a regulating labyrinth having sequentially-closing clearances. Thus, in the initial, unpressurized condition of the hose, these clearances substantially bypass the regulating labyrinth to render it ineffective to restrict the flow; but as water pressure increases, these clearances are sequentially closed to render the regulating labyrinth effective to regulate the flow therethrough in response to the water pressure, as described in the above-cited patent.

Figure 32A:
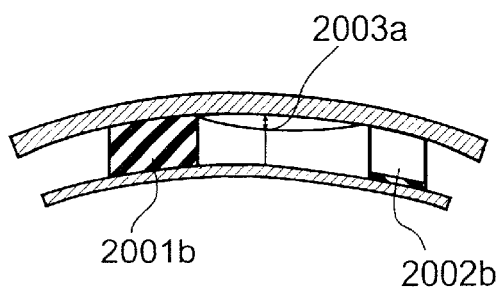
FIGS. 32a and 32b illustrate the clearances along lines A—A and B—B of FIG. 32 at the opposite ends of the labyrinth in the non-pressurized condition of the drip irrigation hose.
Figure 32B:
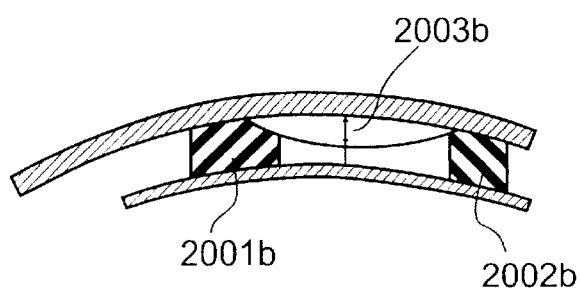

FIG. 32a illustrates the clearance 2003a at one end of the regulating labyrinth defined by teeth 2001b, 2002b; and FIG. 32b illustrates the larger clearance 2003b at the opposite end of the labyrinth defined by these teeth.

It will be appreciated that other techniques for producing sequential-closing clearances could also be used in the regulating labyrinth. In the illustrated construction, the upstream portion of at least the strip defining the teeth 2002a of the fixed labyrinth is formed with slots 2005 (FIG. 31) to serve as inlets into the respective labyrinths.

Figure 33:
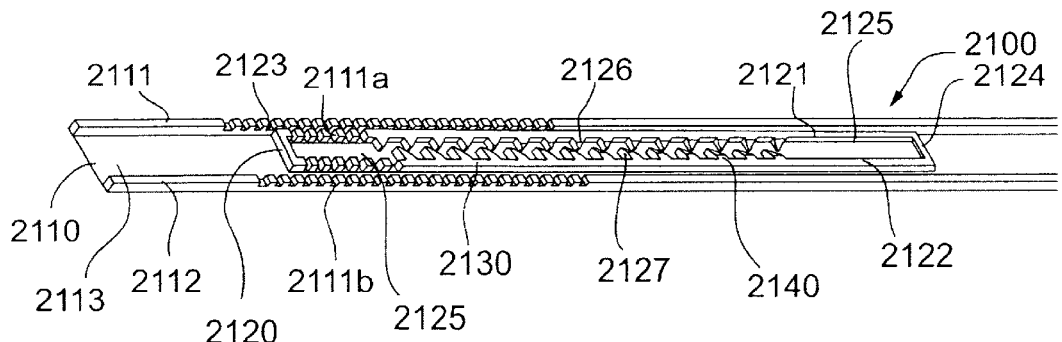
FIG. 33 is a three-dimensional view illustrating a modification in the construction of the emitter strip included in the drip irrigation hose.
Figure 34:
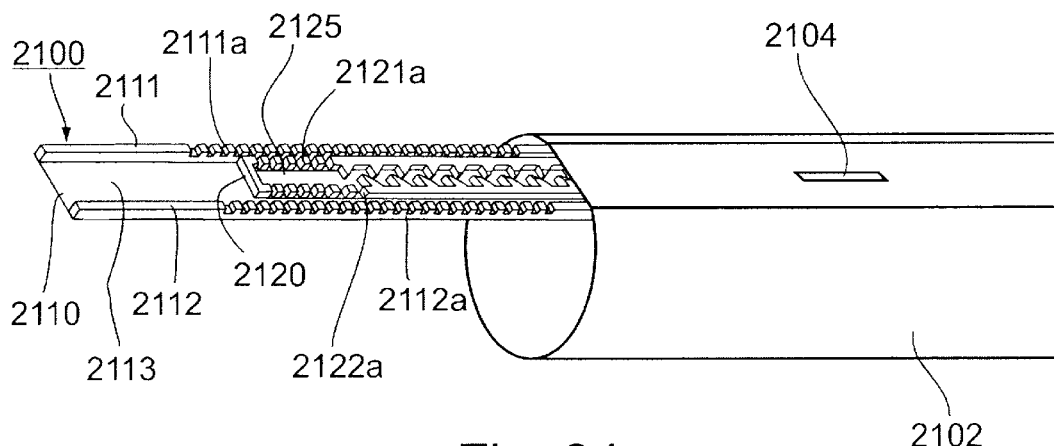
FIG. 34 illustrates the emitter strip of FIG. 33 as applied to the outer tube for producing the drip irrigation hose.

FIGS. 33 and 34 illustrate another construction of emitter unit, generally designated 2100, for application to the inner surface of an outer plastic tube 2102 formed with outlets 2104 for discharging the water after traversing the respective labyrinth. Emitter element 2100 is in the form of a continuous composite strip constituted of a continuous strip 2110 of the relatively inelastic material, such as polyethylene, and a plurality of longitudinally-spaced strips 2120. Each of the latter is made of the relative elastic material and serves as an emitter element defining the labyrinth to the respective outlet 2104.

Figure 34A:
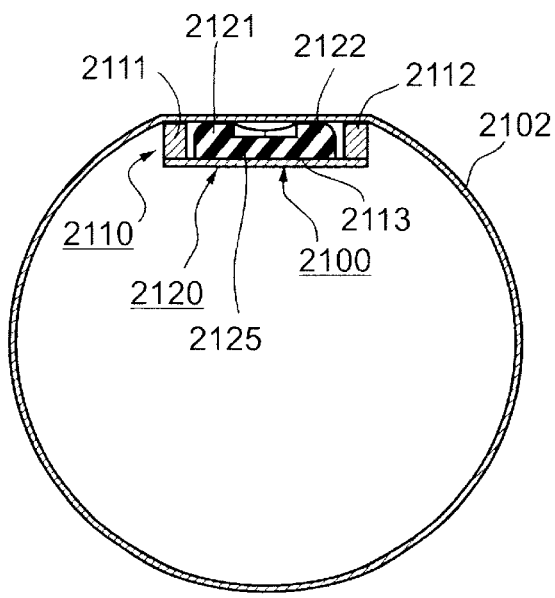
FIG. 34a is a transverse section of the drip irrigation hose of FIG. 33.

Continuous strip 2110 of the relatively inelastic material is formed with a pair of spaced ribs 2111, 2112, along its opposite sides, joined together by a thin flexible web 2113. Each of the emitter element strips 2120 is of the relatively elastic material and is applied to web 2113 of the continuous strip 2110 between, and slightly spaced from, the two ribs 2111 and 2112. The two ribs 2111 and 2112 thus straddle, and are spaced from, the emitter elements 2120, as shown in FIG. 34a.

Each emitter element 2120 is of an open rectangular shape, formed with a pair of opposed longitudinally-extending strips 2121, 2122 joined at the opposite ends by transversely-extending strips 2123, 2124 and all joined together by an underlayer 2125. The longitudinally-extending strips 2121, 2122 are shaped (e.g., by embossing wheel 1264, FIG. 30) into two groups of teeth 2126, 2127 integrally formed with the underlayer 2125, all of the relatively elastic material.

In the construction illustrated in FIG. 33, the two groups of teeth 2126, 2127 in each emitter unit 2120 also define two labyrinths, namely: (1) labyrinth 2130, in which the teeth are of fixed height to produce a fixed pressure drop in the water flowing therethrough; and (2) labyrinth 2140 in which the teeth are of varying height to define sequentially-closing clearances producing a self-regulated pressure drop in the water flowing through that labyrinth, as described above with respect to FIGS. 31 and 32, and in the above-cited U.S. Pat. No. 5,400,973. The fixed-height teeth in labyrinth 2130 are on the upstream side of the emitter unit 2120. They communicate with the water within the tube 2102 through slits 2111a, 2112a, formed in the ribs 2111 and 2112 of the relatively inelastic material, and through slits 2121a and 2122a formed in the strips 2121, 2122, of the relatively elastic material. As described above with respect to FIGS. 31 and 32, a bypass clearance is thus provided, in the non-pressurized condition of the tube, only with respect to the teeth in the regulating labyrinth 2140, and not with respect to the teeth in the fixed pressure-drop labyrinth 2130.

When the emitter unit 2100 illustrated in FIG. 33 is applied to the tube 2102, it will be seen that the emitter unit is bonded to the inner face of the tube along the outer surfaces of the ribs 2111, 2112 of strip 2110 of relatively inelastic thermoplastic material (e.g., polyethylene). The emitter units 2120, particularly when of the relatively elastic thermosetting material described above which does not bond well to a thermoplastic surface, are not bonded to the inner surface of the tube 2102 and thus permit the teeth, particularly of the regulating labyrinth 2140, to more easily deform in response to pressure, and thereby to regulate the water flow therethrough to the respective outlet 2104.

Figure 35:
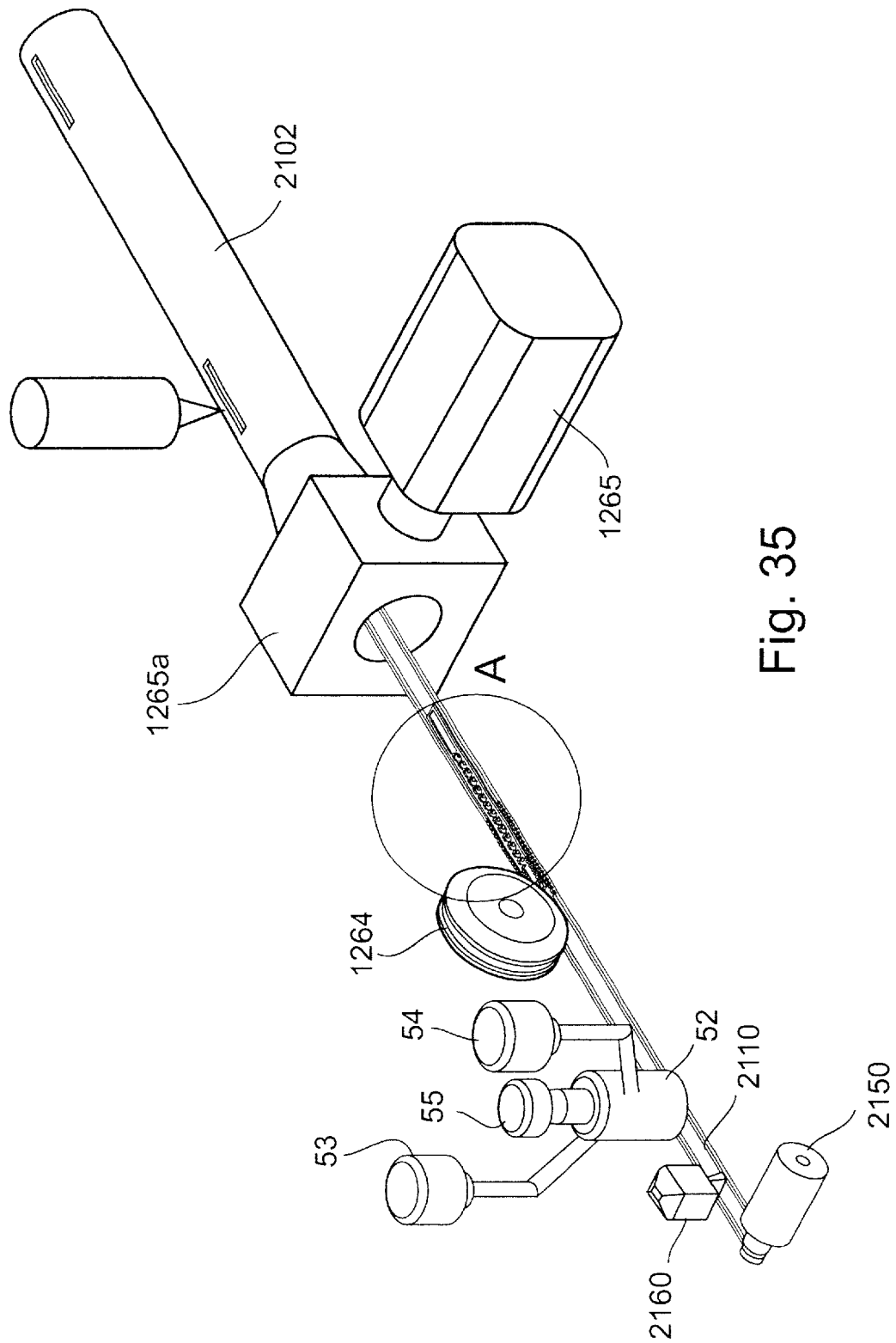
FIG. 35 illustrates apparatus, similar to that of FIG. 30 for making the drip irrigation hose of FIG. 34 including the emitter strip of FIG. 33.

FIG. 35 illustrates apparatus similar to that of FIG. 30 for producing the drip irrigation hose illustrated in FIG. 34. To facilitate understanding, those parts which are substantially the same as those illustrated in FIG. 30 are identified by the same reference numerals.

Thus, as shown in FIG. 35, the strip 2110 of the relatively inelastic material is extruded via an extruder 2150 and is subjected first to a corona discharger 2160 before the relatively elastic material is applied by the heater/mixer 52 supplied from the two liquid sources 53, 54. As described earlier, the two materials are mixed and heated to a temperature lower than the normal curing temperature in the heater mixture 52 so as to begin the cross-linking, and the partially cross-linked product is forced out by piston 55 from the mixture intermittently onto the moving surface of the continuous strip 2110. The partially cross-linked product is embossed by the embossing wheel 1264 to produce the fixed-height labyrinth 2130, and the varying-height labyrinth 2140 (FIGS. 33, 34) before entering the cross-head 1265a wherein the outer tube 2102 is extruded thereover by the extruder 1265.

Figure 36:
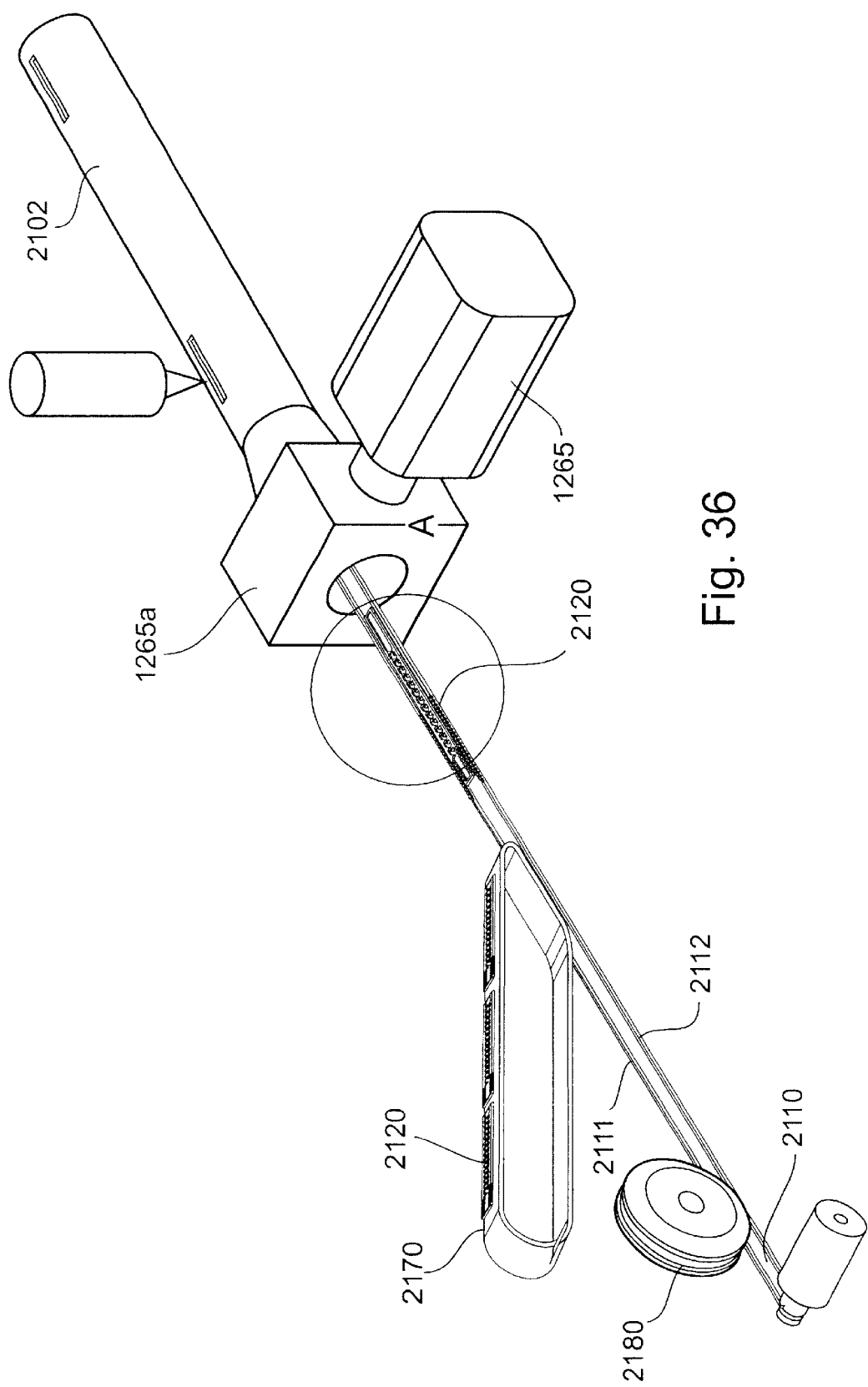
FIG. 36 illustrates apparatus similar to that of FIG. 5c for making the drip irrigation hose illustrated in FIG. 34.

FIG. 36 illustrates apparatus for producing the drip irrigation hose of FIG. 34 but using preformed elastic dripper elements, similar to the apparatus illustrated in FIG. 5c. Thus, as shown in FIG. 36, the preformed elastic emitter elements 2120 are fed by conveyor 2170 onto the continuous strip 2110 of relatively inelastic material before the strip enters the extruder cross-head 1265a for extruding the outer tube 1202. Feeder 2170 may be operated at a lower linear velocity than that of the continuous strip 2110 so that the relatively elastic emitter elements 2120 will be spaced longitudinally along the resulting composite strip.

Since the apparatus illustrated in FIG. 36 does not include an embossing wheel corresponding to embossing wheel 1264 in FIG. 35 for forming the labyrinth in the relatively elastic element 2120, another embossing wheel 2180 is provided, upstream of conveyor 2170, to emboss the ribs 2111, 2112 of the continuous strip 2110 with the slits (2111a, 2112a, FIGS. 33, 34) to define the inlets into the labyrinth.

Figure 37:
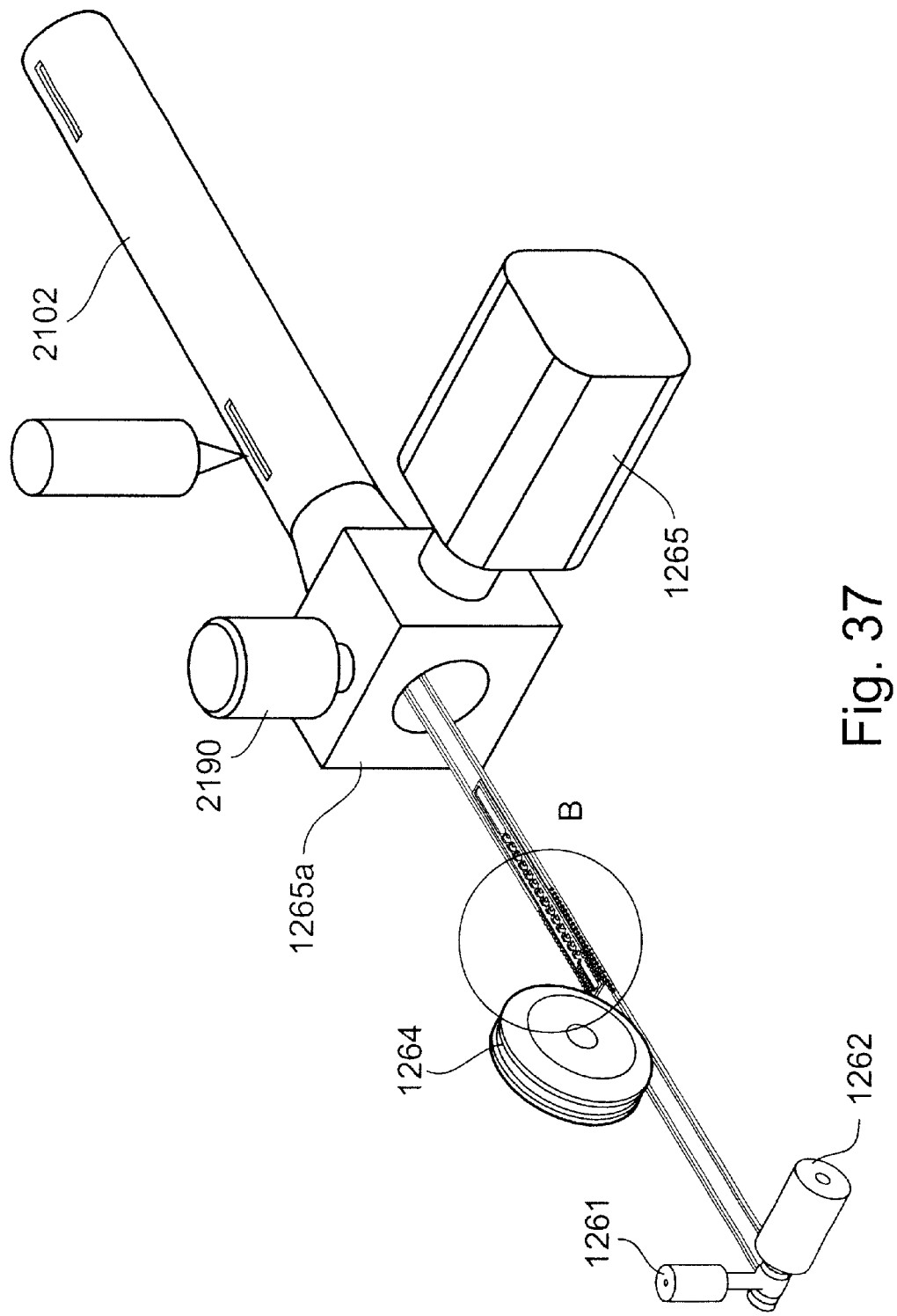
FIG. 37 illustrates a modification in the apparatus of FIG. 22 for applying an adhesive/strengthening coating to the inner surface of the outer tube before bonding same to the drip irrigation emitter strip.

FIG. 37 illustrates apparatus similar to that of FIG. 22, but including a coating applicator 2190 for applying a coating 2203 of an adhesive material on the inner face of the extruded tubes or on the outer face of the composite strip as it travels from the embossing wheel 1264 into the cross-head 1265a for receiving the extruded outer tube 2202 extruded by extruder 1265. Coating 2203 promotes the adhesion of the emitter strip to the inner face of the outer tube and also strengthens the outer tube 2202 at the outlet openings 2204. A material found particularly suitable for this purpose is one sold under the Trademark "POLYGLUE" supplied by SK Corporation. This material is an adhesive resin consisting of a modified polyolefin with functional groups to bond firmly to common polyolefins, polyamides, ethylene vinyl alcohol (EVOH), as well as wood and metals.

The apparatus illustrated in FIG. 37 is otherwise the same as described above with respect to FIG. 22, and therefore the corresponding parts have been identified by the same reference numerals.

Figure 38:
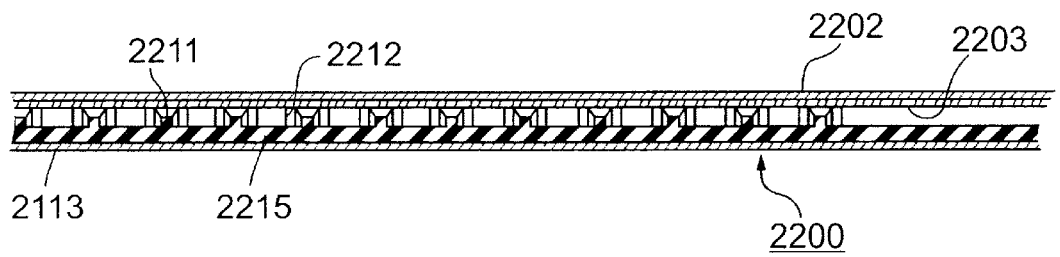
FIG. 38 is a fragmentary view illustrating the drip irrigation hose produced by the apparatus of FIG. 37.
Figure 38A:
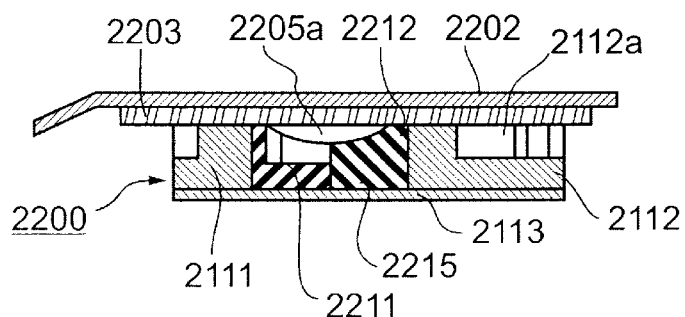
FIGS. 38a and 38b are enlarged sectional views illustrating the drip irrigation hose of FIG. 38 at the opposite ends of a labyrinth.
Figure 38B:
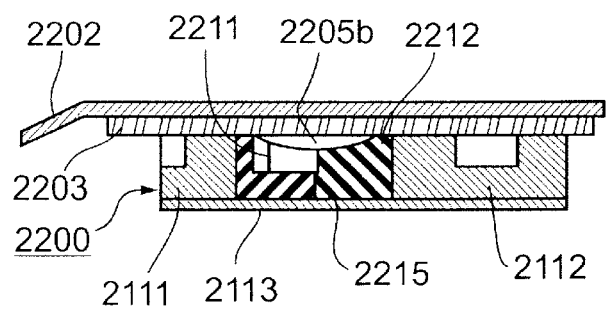
Figure 39:
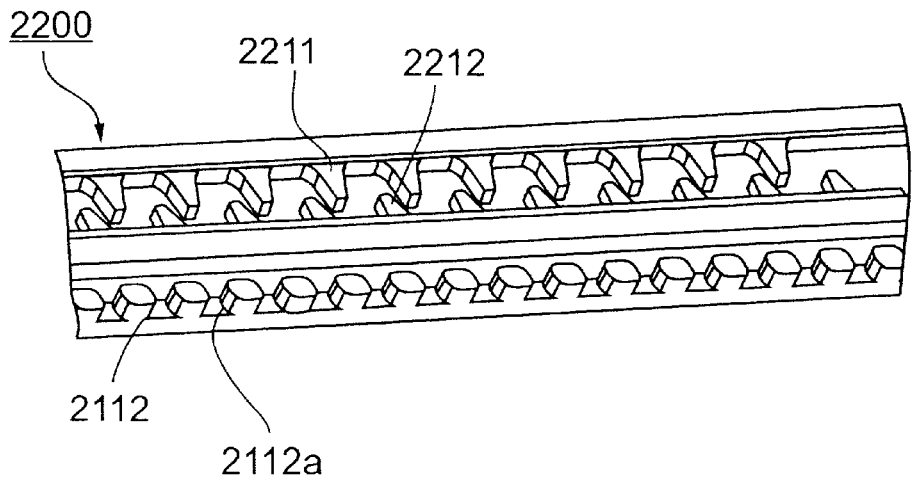
FIG. 39 is a three-dimensional fragmentary view of the drip irrigation hose of FIG. 38.

FIGS. 38 and 39 illustrate a fragment of the drip irrigation tube producing by the apparatus of FIG. 37; whereas FIGS. 38a and 38b are enlarged fragmentary views illustrating the structure of each emitter element, therein designated 2200, at the opposite ends of the respective labyrinth. Thus, as shown, the emitter element 2200 is bonded to the inner face of the outer tube 2202 by the adhesive layer 2203 applied by the applicator 2190. The emitter element 2200 may be of any of the above-described constructions, but preferably is formed with a labyrinth having sequentially closing clearances as indicated by the different size clearances 2205a, 2205b, in the two fragmentary views of FIGS. 38a and 38b, respectively. As shown, the two groups of teeth 2211, 2212 of relatively elastic material are integrally formed with an underlayer 2215 of the relatively elastic material, and the two ribs 2111, 2112 of relatively inelastic material are joined by the web to which the relatively elastic material is applied.

Figure 40A:
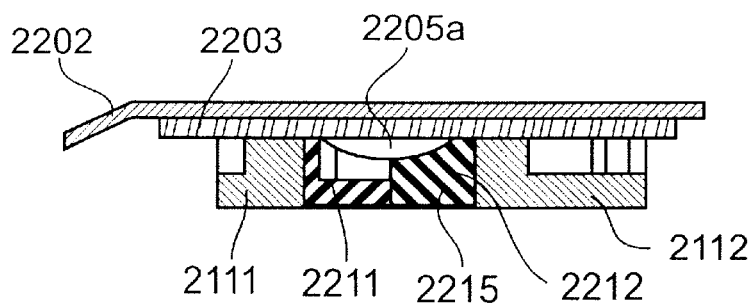
FIGS. 40a and 40b are views corresponding to FIGS. 38a and 38b but illustrating a still further construction of drip irrigation tube in accordance with the present invention.
Figure 40B:
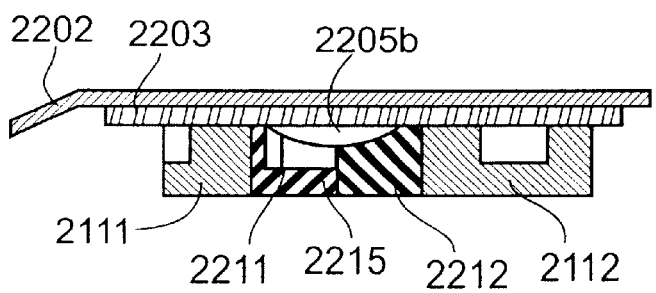

FIGS. 40a and 40b are sectional views, corresponding to FIGS. 38a and 38b, of a drip irrigation hose wherein the two strips 2111, 2112, of relatively inelastic material are not joined by a web, corresponding to web 2113 of relatively inelastic material, as shown in FIGS. 33 and 34. In the modified construction illustrated in FIGS. 40a, 40b, therefore, the underlayer 2215 of the relatively elastic material is therefore directly exposed to the water within the drip irrigation hose, thereby making this labyrinth more sensitive to changes in the water pressure for regulating the flow therethrough.

While the invention has been described with respect to several preferred embodiments, it will be appreciated that these are set forth merely for purposes of example, and that many other variations, modifications and applications of the invention may be made.

What is claimed is:

1. A drip irrigation hose, comprising:
   a tube for conducting pressurized water through its interior and formed with a plurality of outlets for discharging the water at longitudinally-spaced locations along the length of the tube;
   and a plurality of emitter elements secured within said tube at longitudinally-spaced locations along its length to define a plurality of labyrinths each in communication with the interior of the tube for discharging water from a tube outlet at a slow rate;
   said labyrinths being defined by a continuous strip of a relatively elastic first material bonded to a continuous strip of a relatively inelastic second material such that said relatively elastic first material is pressure-deformable as compared to the relatively inelastic second material to change the labyrinth of each emitter element in response to the pressure of the water in the tube at the respective emitter element.

2. The drip irrigation hose according to claim 1, wherein said continuous strip is shaped to define a of group of teeth for each of said emitter elements producing turbulent flow passageways between them at each of said longitudinally spaced locations along the length of said continuous strip.

3. The drip irrigation hose according to claim 2, wherein said relatively elastic material is shaped to define the tips of said teeth integrally formed with an underlayer at each of said longitudinally spaced locations along the length of said continuous strip.

4. The drip irrigation hose according to claim 2, wherein said relatively inelastic material is shaped to include a pair of ribs straddling and spaced from said groups of teeth.

5. The drip irrigation hose according to claim 4, wherein said relatively elastic material is shaped also to define an underlayer connecting, and integrally formed with, said teeth at each of said longitudinally spaced locations along the length of said continuous strip.

6. The drip irrigation hose according to claim 4, wherein said relatively stiff material is shaped to define a web connecting, and integrally formed with, said pair of ribs at each of said longitudinally spaced locations along the length of said continuous strip.

7. The drip irrigation hose according to claim 2, wherein said hose is formed with a clearance between said tube and said plurality of emitter elements, said clearance normally bypassing at least a part of the teeth in each group in the non-pressurized condition of the hose and being closed in the pressurized condition of the hose to render labyrinths effective to regulate the flow therethrough in response to pressure.

8. The drip irrigation hose according to claim 7, wherein said clearance does not bypass at least some of said teeth in the non-pressurized condition of the hose.

9. The drip irrigation hose according to claim 7, wherein the tips of said teeth are reduced in height to define said clearance.

10. The drip irrigation hose according to claim 7, wherein said clearance is defined by a longitudinally-extending slack in said tube.

11. The drip irrigation hose according to claim 1, wherein said strip of relatively inelastic material is bonded to the inner surface of said tube by an adhesive which also reinforces said tube at said outlets.

12. The drip irrigation hose according to claim 1, wherein the material of said tube, and said relatively inelastic material, are both of polyethylene.

13. The drip irrigation hose according to claim 1, wherein said relatively elastic material is a thermoplastic elastomer.

14. The drip irrigation hose according to claim 1, wherein said relatively elastic material is a thermosetting elastomer produced by mixing and curing two liquids.

15. A drip irrigation hose, comprising:
a tube for conducting pressurized water through its interior and formed with a plurality of outlets for discharging the water at longitudinally-spaced locations along the length of the tube;
and a plurality of emitter elements secured to said tube at longitudinally-spaced locations along its length to define a plurality of labyrinths each in communication with the interior of the tube for discharging water from a tube outlet at a slow rate;
each of said emitter elements including a relatively elastic material shaped to define at least a part of a labyrinth and a relatively inelastic material underlying said relatively elastic material and bonding same to the inner face of the tube;
said relatively inelastic material being in the form of a continuous strip extending the length of said tube.

16. The drip irrigation hose according to claim 15, wherein said relatively inelastic material is shaped to define a pair of ribs straddling said labyrinths and a web connecting, and integrally formed with, said pair of ribs.

17. The drip irrigation hose according to claim 16, wherein said ribs in the relatively inelastic material are formed with slots defining inlet openings to the respective labyrinth.

18. The drip irrigation hose according to claim 15, wherein said relatively elastic material is also in the form of a continuous strip extending the length of said tube.

19. The drip irrigation hose according to claim 15, wherein said relatively elastic material is in the form of discrete strips applied to said continuous strip of inelastic material at spaced locations along the length thereof.

20. The drip irrigation hose according to claim 15, wherein said continuous strip of relatively inelastic material is bonded to the inner surface of said tube by an adhesive which also reinforces said tube at said outlets.

21. A drip irrigation hose, comprising:
a tube for conducting pressurized water through its interior and formed with a plurality of outlets for discharging the water at longitudinally-spaced locations along the length of the tube;
and a plurality of emitter elements secured to said tube at longitudinally-spaced locations along its length to define a plurality of labyrinths each in communication with the interior of the tube for discharging water from a tube outlet at a slow rate;
said labyrinths being defined by a continuous strip of a relatively inelastic material having a relatively elastic material applied thereto and shaped to define a group of teeth for each of said emitter elements producing turbulent flow passageways with respect to said tube at each of said longitudinally spaced locations along the length of said continuous strip;
said drip irrigation hose being formed with a clearance between said tube and said teeth normally bypassing at least a part of each labyrinth in the non-pressurized condition of the hose and being closed in the pressurized condition of the hose to render said labyrinths effective to regulate the flow therethrough in response to pressure.

22. The drip irrigation hose according to claim 21, wherein the tips of said teeth are reduced in height to define said clearance.

23. The drip irrigation hose according to claim 21, wherein said clearance is defined by a longitudinally-extending slack in said tube.

24. The drip irrigation hose according to claim 21, wherein said continuous strip of relatively inelastic material is shaped to define a pair of ribs straddling said teeth.

25. The drip irrigation hose according to claim 24, wherein said relatively inelastic material is shaped also to define a web connecting, and integrally formed with, said pair of ribs.

26. The drip irrigation hose according to claim 21, wherein said relatively elastic material is shaped also to define an underlayer connecting, and integrally formed with, at least the tips of said teeth.

27. The drip irrigation hose according to claim 21, wherein said strip of relatively inelastic material is bonded to the inner surface of said tube by an adhesive which also reinforces said tube at said outlets.

28. A drip irrigation hose, comprising:
a tube for conducting pressurized water through its interior and formed with a plurality of outlets for discharging the water at longitudinally-spaced locations along the length of the tube;
and a plurality of emitter elements secured within said tube at longitudinally-spaced locations along its length to define a plurality of labyrinths each in communication with the interior of the tube for discharging water from a tube outlet at a slow rate;
said plurality of emitter elements including a continuous strip of a relatively elastic material shaped to form a plurality of groups of teeth defining turbulent flow passageways between them at each of said longitudinally spaced locations along the length of said continuous strip, said relatively elastic material defining at least the tips of said teeth integral with an underlayer underlying said teeth.

29. The drip irrigation hose according to claim 28, wherein said continuous strip further includes a continuous strip of relatively inelastic material shaped to define at least one rib laterally of said plurality of groups of teeth.

30. The drip irrigation hose according to claim 29, wherein said relatively inelastic material shaped to define a pair of ribs straddling said teeth, and a web connecting and integrally formed with said pair of ribs.

31. The drip irrigation hose according to claim 28, wherein said hose is formed with a clearance between said tube and said plurality of emitter elements, said clearance normally bypassing at least a part of the teeth in each group in the non-pressurized condition of the hose and being closed in the pressurized condition of the hose to render labyrinths effective to regulate the flow therethrough in response to pressure.

32. The drip irrigation hose according to claim 28, wherein said continuous strip is bonded to the inner surface of said tube by an adhesive which also reinforces said tube at said outlets.

33. A method of making a drip irrigation hose, comprising:

extruding a continuous strip of a relatively inelastic material;

applying to said continuous strip of relatively inelastic material a relatively elastic material to occupy discrete, longitudinally-spaced locations along the length of said continuous strip, said relatively elastic material being shaped at each of said longitudinally-spaced locations to define at least a part of an emitter element having a turbulent flow passageway, an inlet end thereto, and an outlet end therefrom;

extruding a continuous tube over said continuous strip;

bonding said continuous strip to the inner surface of said extruded tube such that the interior of the tube communicates with the inlet end of each of said emitter elements; and perforating said extruded tube with a plurality of holes at longitudinally-spaced locations, each hole aligned with the outlet end of one of said emitter elements.

34. The method according to claim 33, wherein said relatively elastic material is applied to said continuous strip of relatively inelastic material while said continuous strip is moving.

35. The method according to claim 33, wherein said relatively elastic material is shaped into said plurality of emitter elements after said relatively elastic material is applied to said continuous strip of relatively inelastic material.

36. The method according to claim 33, wherein said relatively elastic material is shaped into said plurality of emitter elements before said relatively elastic material is applied to said continuous strip of relatively stiff material.

37. The method according to claim 33, wherein said relatively elastic material is intermittently extruded as discrete strips onto said continuous strip of relatively inelastic material.

38. The method according to claim 33, wherein said relatively elastic material is shaped to define a plurality of groups of teeth spaced longitudinally along the length of said continuous strip, the teeth in each of said groups being arranged in two parallel rows defining a said turbulent flow passageway between them.

39. The method according to claim 38, wherein said relatively elastic material is shaped such that at least the tips of said teeth, and an underlayer underlying said teeth, are constituted of said relatively elastic material.

40. The method according to claim 38, wherein said relatively inelastic material is shaped to define a pair of ribs straddling the opposite sides of each of said groups of teeth.

41. The method according to claim 40, wherein at least one of said ribs of said relatively inelastic material is formed with slots serving as inlets to said emitter elements.

42. The method according to claim 33, wherein said relatively elastic material is extruded from a source of a thermoplastic elastomer.

43. The method according to claim 33, wherein said relatively elastic material is applied from a mixer supplied from two sources of liquids which cross-link to produce a thermosetting elastomer.

44. The method according to claim 33, wherein an adhesive is applied to coat the inner surface of the extruded tube to receive said continuous strip, said adhesive coating promoting the adhesion of said continuous strip to said extruded tube and also reinforcing said extruded tube at the holes formed therethrough during the perforating operation.

45. A method of making a drip irrigation hose, comprising:

extruding a continuous strip of a relatively inelastic material;

applying over said continuous strip of relatively inelastic material a mixture of two liquids capable of being cured by cross-linking to form a relatively elastic material;

shaping said relatively elastic material into at least a part of a plurality of emitter elements spaced longitudinally along the length of said continuous strip of relatively inelastic material, with each emitter element having a turbulent flow passageway, an inlet end thereto, and an outlet end therefrom;

extruding a continuous tube over said continuous strip;

bonding said continuous strip to the inner surface of said extruded tube such that the interior of the tube communicates with the inlet end of each of said emitter elements; and perforating said extruded tube with a plurality of holes at longitudinally-spaced locations, each hole aligned with the outlet end of one of said emitter elements.

46. The method according to claim 45, wherein said mixture of two liquids is intermittently applied over said continuous strip of relatively inelastic material.

47. The method according to claim 45, wherein said mixture of two liquids is applied as a continuous strip over said continuous strip of relatively inelastic material.

48. The method according to claim 45, wherein said mixture of two liquids is only partially cured at the time of its application to said continuous strip, the curing being completed after the mixture is applied and formed into said plurality of emitter elements.

49. The method according to claim 45, wherein said mixture is applied over said continuous strip of relatively inelastic material while said strip is moving.

50. The method according to claim 45, wherein said relatively elastic material is shaped into said plurality of emitter elements by an embossing wheel.

* * * * *

UNITED STATES PATENT AND TRADEMARK OFFICE
CERTIFICATE OF CORRECTION

| | |
|---|---|
| PATENT NO. | : 6,886,761 B2 |
| APPLICATION NO. | : 10/197433 |
| DATED | : May 3, 2005 |
| INVENTOR(S) | : Amir Cohen |

Page 1 of 1

It is certified that error appears in the above-identified patent and that said Letters Patent is hereby corrected as shown below:

On the title page, correct the section entitled

Related U.S. Application Data as follows:

(63)  Continuation-in-part of PCT application PCT/IL01/00751 filed August 13, 2001, which claims priority from application Serial No. 09/639,768 filed on August 21, 2000, now US Patent No. 6,371,390

Signed and Sealed this

Twenty-third Day of October, 2007

JON W. DUDAS
*Director of the United States Patent and Trademark Office*